March 15, 1966  R. J. DOMENICO ET AL  3,241,118
FLOW TABLE LOGIC
Filed May 16, 1961  16 Sheets-Sheet 1
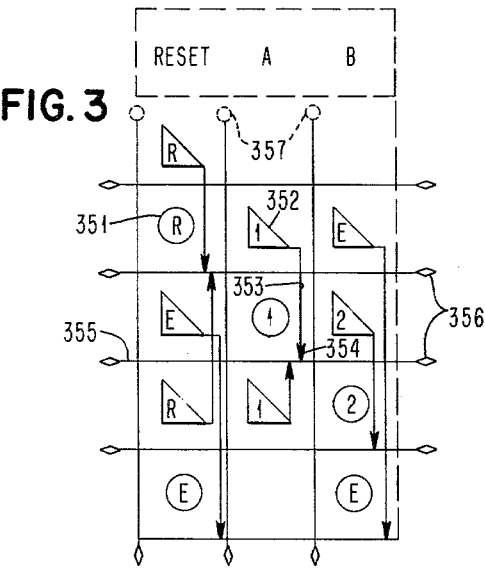
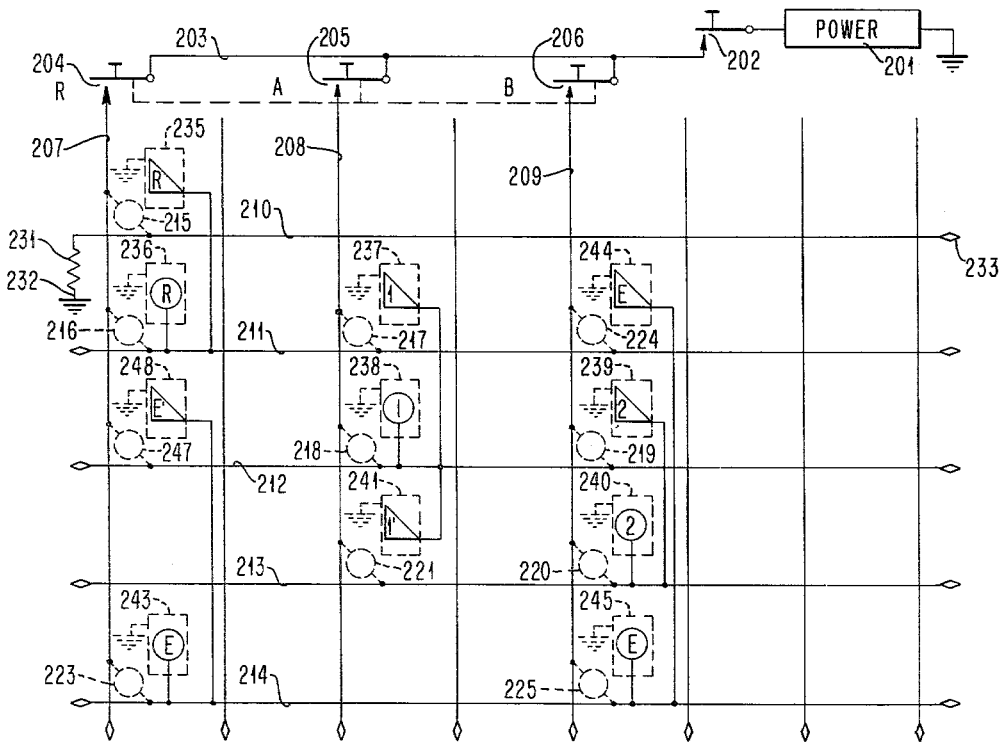
INVENTORS
ROBERT J. DOMENICO
PAUL R. LOW
GERALD A. MALEY
BY Carl C. Kling
ATTORNEY FIG. 13
FIG. 14a
FIG. 14b
FIG. 14c
FIG. 15
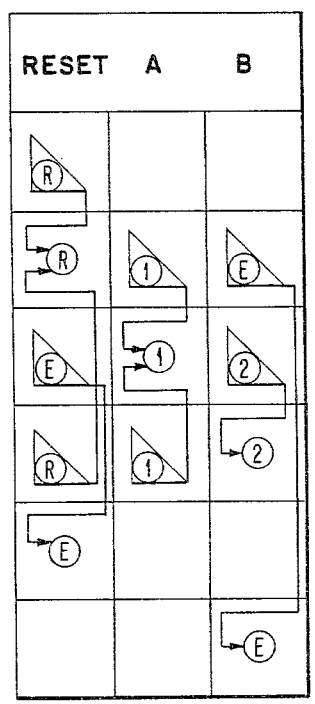
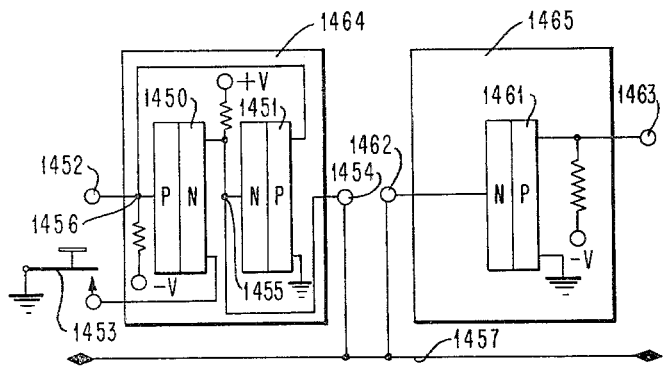
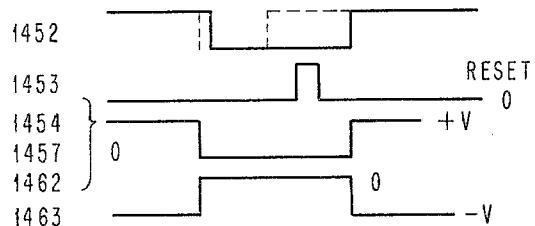
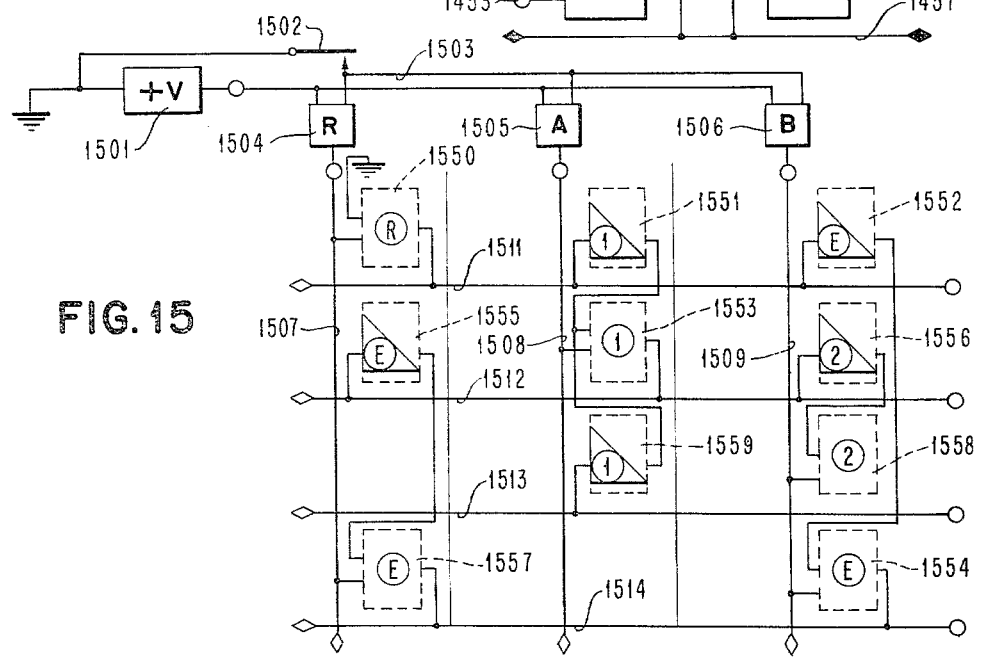

March 15, 1966 R. J. DOMENICO ET AL 3,241,118
FLOW TABLE LOGIC
Filed May 16, 1961 16 Sheets-Sheet 11

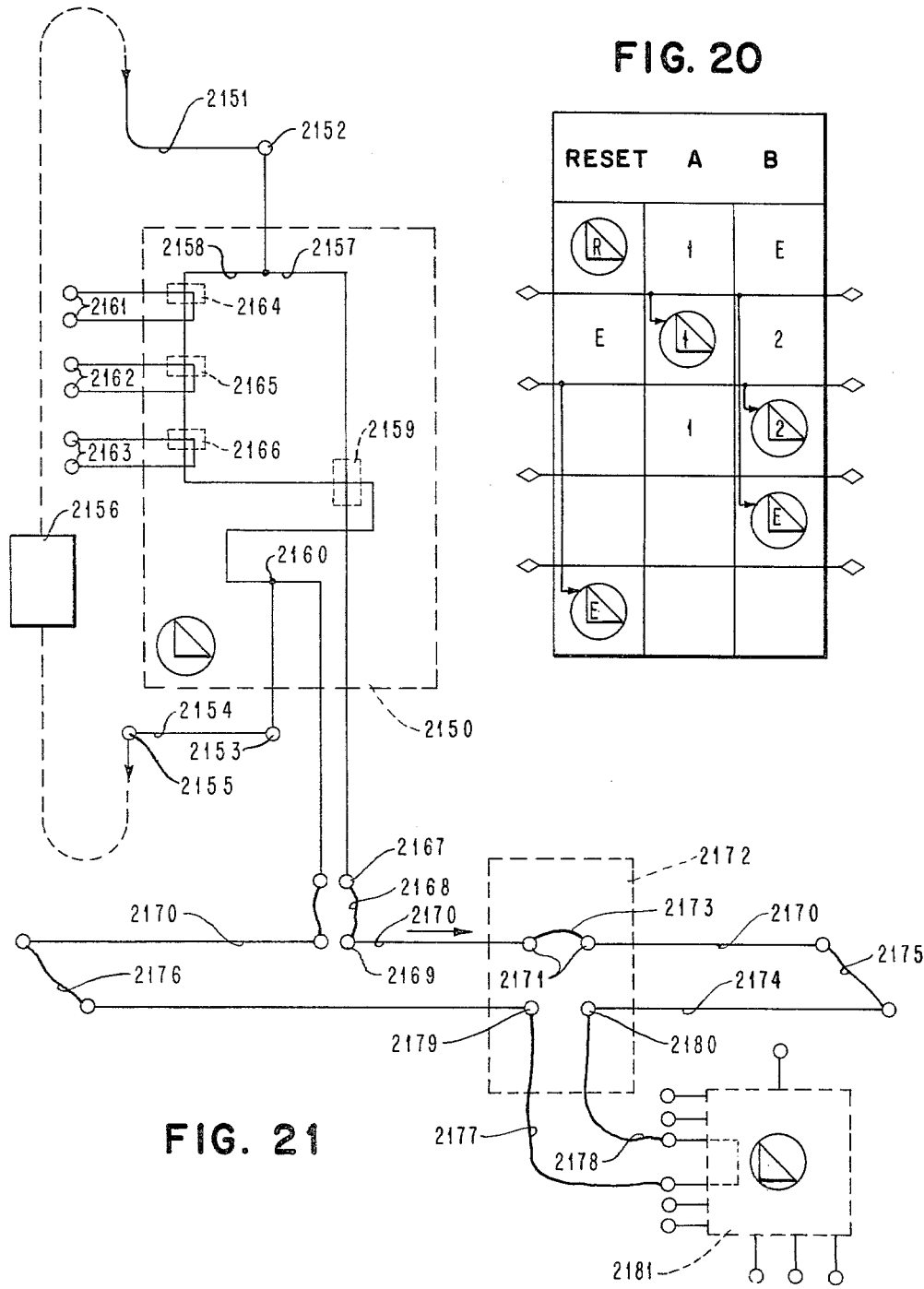

March 15, 1966 R. J. DOMENICO ET AL 3,241,118

FLOW TABLE LOGIC

Filed May 16, 1961 16 Sheets-Sheet 14

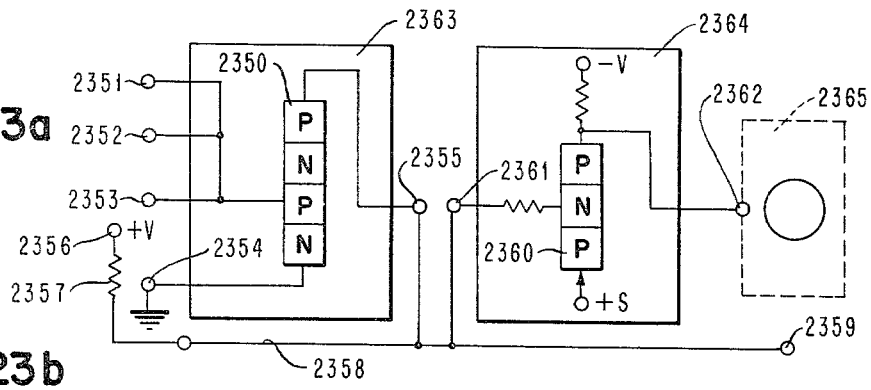
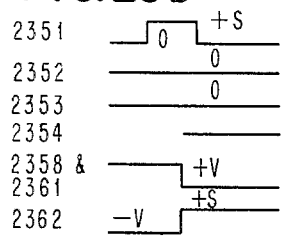
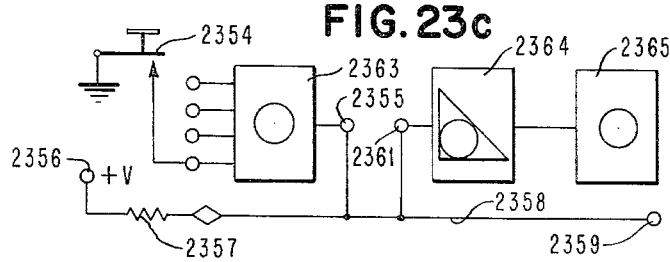
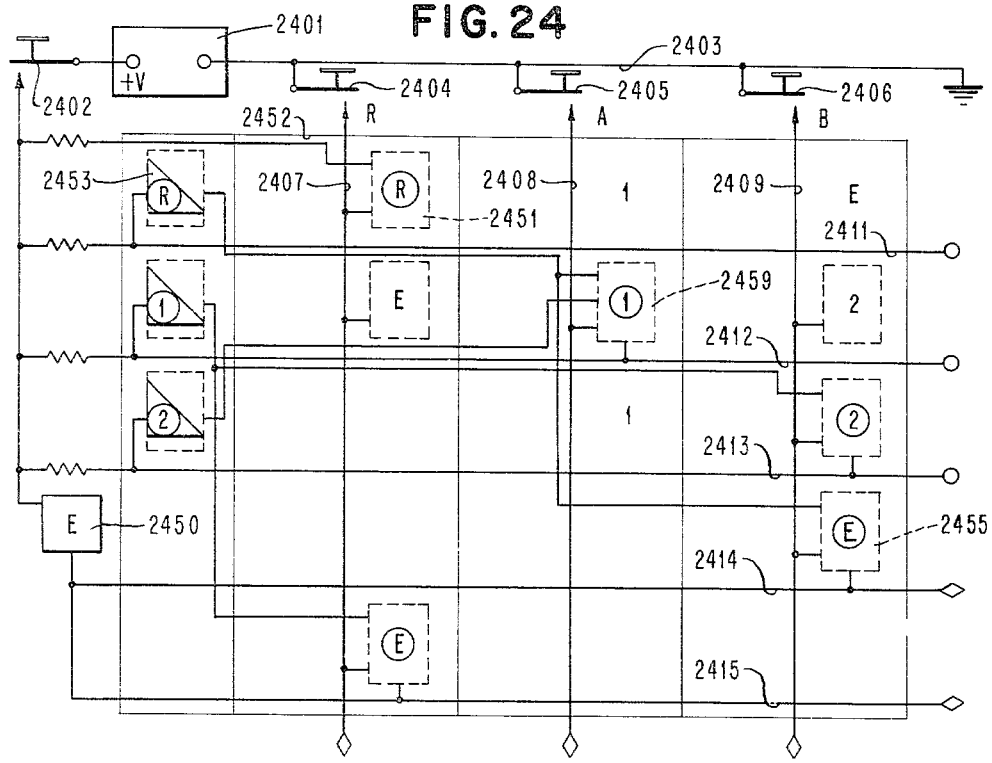

March 15, 1966 R. J. DOMENICO ET AL 3,241,118
FLOW TABLE LOGIC
Filed May 16, 1961 16 Sheets-Sheet 16
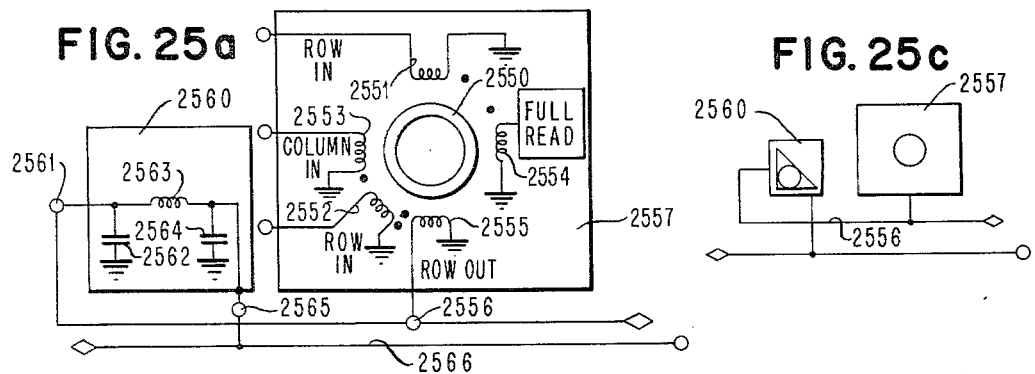
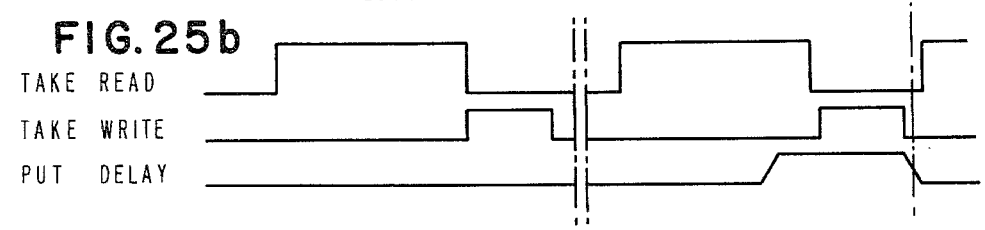

United States Patent Office 3,241,118
Patented Mar. 15, 1966

3,241,118
FLOW TABLE LOGIC
Robert J. Domenico, Wappingers Falls, N.Y., Paul R. Low, Palo Alto, Calif., and Gerald A. Maley, Poughkeepsie, N.Y., assignors to International Business Machines Corporation, New York, N.Y., a corporation of New York
Filed May 16, 1961, Ser. No. 111,422
23 Claims. (Cl. 340—166)

This invention relates to sequential switching devices, and particularly to a method and means for synthesizing complex sequential devices. This is a continuation-in-part of U.S. patent application Serial No. 046,149, filed July 29, 1960, by the same inventors and assignee, entitled Flow Table Logic, now abandoned.

The synthesis of sequential switching circuits, such as those used in computers and other logical devices, once an empirical art, is evolving into a science. Circuit algebra has been explained in detail in texts such as Richards, Arithmetic Operations in Digital Computers, Van Nostrand, 1955; Phister, Logical Design of Digital Computers, Wiley & Sons, 1958; and Caldwell, Switching Circuits and Logical Design, Wiley & Sons, 1958. Various analytical methods have been presented to effect circuit simplification, essentially by algebraic methods of analysis which detect imperfections and in some cases suggest an optimum circuit pattern or component count.

Caldwell, in chapters 12 through 15, beginning at page 543, outlines a system for synthesizing electronic switching circuits according to a "flow table." In essence, the flow (or sequence of switching) is down a chart which has a series of horizontal rows of boxes formed by intersecting horizontal and vertical lines. The boxes are designated as to function by column position. The usual sequential switching mechanism, at any point in its operation, infers a past history, exhibits a present condition by row position, and retains a possibility of plural future conditions. Choice of future condition depends upon present condition and input, by row position and column input. The flow table illustrates history by numbering—it is usual to have a stable state for each row or period of history, and a switching or unstable state intervening between each two stable states.

Virtually all possible sequential switching problems are susceptible to flow table description. A flip-flop multivibrator, or scale-of-two counter, for example, is a device which may be described in a four-level table of eight blocks, as follows:

|     |     | Historical Level at Unstable Point |
| --- | --- | --- |
| (1) | 2   | Input and Output |
| 3   | (2) | Not Input and Output |
| (3) | 4   | Input and Not Output |
| 1   | (4) | Not Input and Not Output |

Unstable State: 1 2 3 4      Input:  − + − +.
Stable State: (1) (2) (3) (4)   Output: − + + −.

(1)   2   (3)   3   (3)   4   (4)   1   (1)   2   (2;

In   ___|‾‾‾|___|‾‾‾|___|‾‾‾|___|‾‾‾|___

Out  _____|‾‾‾‾‾‾‾|_____|‾‾‾‾‾‾‾|_____

In the simplest form of a scale-of-two counter of multivibrator type, the input alternates at fixed frequency. The output alternates at half the input frequency. There is a stable state in which both input and output are deconditioned, and other stable states where one or the other or both input and output are conditioned. A switching function occurs for each change of state, as follows:

(1) Output remains deconditioned.
 2  Input conditioned to condition output.
(2) Output remains conditioned.
 3  Input deconditioned.
(3) Output remains conditioned.
 4  Input conditioned to decondition output.
(4) Output remains deconditioned.
 1  Input deconditioned.

The flow table thus developed describes the sequential switching device accurately, without ambiguity, repetition or gaps. Synthesis of circuits, and optimization of existing circuits, have been in the prior art greatly aided by a flow table description of the device and by suitable interpolation to and from the electrical logical circuits such as AND, OR, INVERTER, or like circuits which make up the device in hardware.

It is the object of this invention to produce sequential switching circuits in hardware directly from the flow table.

Another object is to provide flow table logic circuits for implementing a device directly from the flow table.

A specific object is to provide a flow table logic pulse generator.

Another specific object is to provide a flow table logic combination lock.

Still another specific object is to provide a flow table logic four-stage ring.

A second level object is to provide basic flow table logic circuits in each of the following technologies:

Neon-photoconductor
Electroluminor-photoconductor
Semiconductor
Superconductor
Ferromagnetics

SUMMARY

The invention simplifies the construction and design of a logical machine by providing for direct implementation of the flow table into hardware in the form of flow table logic. The logical design and electrical circuit design are complete once the flow table for the machine is complete and the choice of component is made.

The completed, packaged segment of the logical machine is recognizable as a flow table in hardware. The active elements are in two configurations: the flow table logic RETAINER and the flow table logic DIRECTOR. Each RETAINER operates to form a stable state; each DIRECTOR transfers a RETAINER condition from one RETAINER to another. A DIRECTOR may connect two RETAINER circuits which are many historical steps apart, thus skipping steps—it may also reverse history and go back several steps, after which the steps may be repeated.

In hardware, flow table logic comprises a plurality of vertical conductors and a plurality of horizontal conductors generally in checkerboard or grid pattern. The vertical conductors are insulated from the horizontal conductors. The vertical conductors correspond to the left line of the related columns in the flow table; the horizontal conductors correspond to the base line of the related flow table rows. The flow table logic RETAINER is generally a regenerative latch connected across the related column conductor and row conductor at their intercept point and placed within the block designated as a stable state block.

The RETAINER circuit, depending upon the component chosen, utilizes self-latching characteristics or regenerative feedback to take and retain one of two stable states, which are herein designated "conditioned" and "deconditioned," and maintain the related row conductor similarly at a conditioned or deconditioned level.

The flow table logic DIRECTOR, which corresponds to the unstable state in the flow table, is a switching circuit responsive to conditioning of its own row conductor to condition a RETAINER in a different row.

There are two basic families of flow table logic, which may be designated direct flow table logic and primed flow table logic. Choice of component (transistor, superconductor, photologic, etc.) generally determines the family, although certain components are effective both in direct and primed flow table logic.

In direct flow table logic, the flow table logic DIRECTOR is effective upon coincident conditioning of its row line and column line to condition the related flow table logic RETAINER.

In primed flow table logic a single DIRECTOR circuit for each row of the flow table is effective upon appearance of a conditioning electrical stimulus on the related row conductor to prime or preenergize all the possible flow table RETAINER circuits to which stability may be transferred. Actual choice of RETAINER circuit fro transfer of stability occurs as a result of an electrical stimulus upon the column line related to the selected RETAINER.

Advantageous features of the invention are its symmetry, two-dimensional character, and standardization on two basic circuits, the DIRECTOR circuit and RETAINER circuit.

These features speed circuit design, since preprinted flow table logic work sheets for each technology are readily available. The designer prepares flow table and circuit diagram in logical sequence on the single work sheet.

Avantages of this symmetry and standardization are myriad. A logical machine can be designed completely on standard flow table logic charts. A model can be quickly assembled in slow, cheap, easily debuggable technology such as neon-photoconductor. This model can be operated for job capability determination, taking the place of computer simulation techniques presently used. After design changes have been incorporated, the market machine can be assembled in a faster, more expensive technology from the original (corrected for design changes) flow table logic charts. Logical design is exempted from the specific problems peculiar to the final choice of component.

The possibility of quick model changeover to a newly invented technology is apparent, with development cost concentrated on the problem of designing a set of flow table logic DIRECTOR and RETAINER circuits using the newly invented component.

These features speed automation, since the physical structure of the basic row and column conductors and the location of intercept points is unchanging for various circuits of identical technology. The flow table logic assembly machine need be programmed for two standard parts only per intercept point—DIRECTOR and RETAINER, or to skip over the intercept point. The single basic variable in most technologies, the DIRECTOR connection to another row, varies only in configuration of a conductor.

Standardization on two basic circuit configurations drastically cuts costs. Inventory, paper work and spare parts stocking are minimized—circuit designers are freed for other tasks.

The foregoing and other objects, features and advantages of the invention will be apparent from the following more particular description of preferred embodiments of the invention, as illustrated in the accompanying drawings.

In the drawings:

The invention is illustrated by several embodiments involving similar overall functions and differing technologies. One figure, for example, shows a simple sequential switching device in transistor technology; another figure shows a device capable of the same sequential switching functions in superconductor technology. Most figures are complete in themselves; reference to other figures, though generally not necessary for understanding of the particular switching device, is often useful in presenting analogies.

The numeration of the reference characters is significant; the hundreds (and thousands) digits indicate figure number while the tens and units digits specify a structural or circuit element. The blocks of reference characters ending in 00–49 are reserved to indicate analogies between related figures—for example, reference character 1227 in FIG. 12 is expected to designate an element analogous to that designated by reference character 327 in FIG. 3.

The blocks of reference characters ending in 50–99 are open—there is no analogy to be expected between element 474 and element 1174, for example.

Where the same element is shown in more than one figure, it retains its first designation. For example, unlock solenoid 772 appears in FIGS. 7 and 11, but is always designated 772.

Embodiments of flow table logic in various technologies are first illustrated and explained with reference to a single simple push button AB pulse generator. Special applications of certain technologies also are shown.

FIG. 1 is a flow table for the push-button AB pulse generator.

FIG. 2 is a schematic diagram of a neon-photoconductor circuit developed from the FIG. 1 flow table.

FIG. 3 is a schematic chart of a direct flow table logic pulse generator corresponding to the FIG. 1 flow table.

FIG. 4 is a flow table for the combination lock unlock mechanism.

FIG. 5 is a schematic chart of a direct flow table logic combination lock unlock mechanism corresponding to the FIG. 4 flow table.

FIG. 6 is a schematic diagram of neon-photoconductor RETAINER circuits involved in the unlock portion of the combination lock.

FIG. 7 is a schematic diagram of the complete unlock mechanism of the combination lock.

FIG. 8 is a flow table for the entire combination lock including the unlock mechanism and adding an alarm flow table for any breaches of the unlock sequence.

FIG. 9 is a schematic chart of the entire combination lock of FIG. 8.

FIG. 10 is a schematic diagram of the neon-photoconductor combination lock of FIG. 7 with addtional RETAINER circuits for the alarm.

FIG. 11 is a schematic diagram of the complete neon-photoconductor combination lock.

FIG. 13 is a schematic chart of the pushbutton pulse generator corresponding to the FIG. 1 flow table in primed flow table logic.

FIGS. 14a, 14b and 14c illustrate a field-effect transistor set of flow table logic circuits and their characteristics.

FIG. 15 is a schematic diagram of the pulse generator in field effect transistor semiconductor technology.

FIG. 20 is a schematic chart for the pulse generator corresponding to the FIG. 1 flow table in a RETAINER primed flow table logic.

FIG. 21 is a schematic diagram of a set of flow table logic circuits in superconductor technology.

Figures 4, 5:
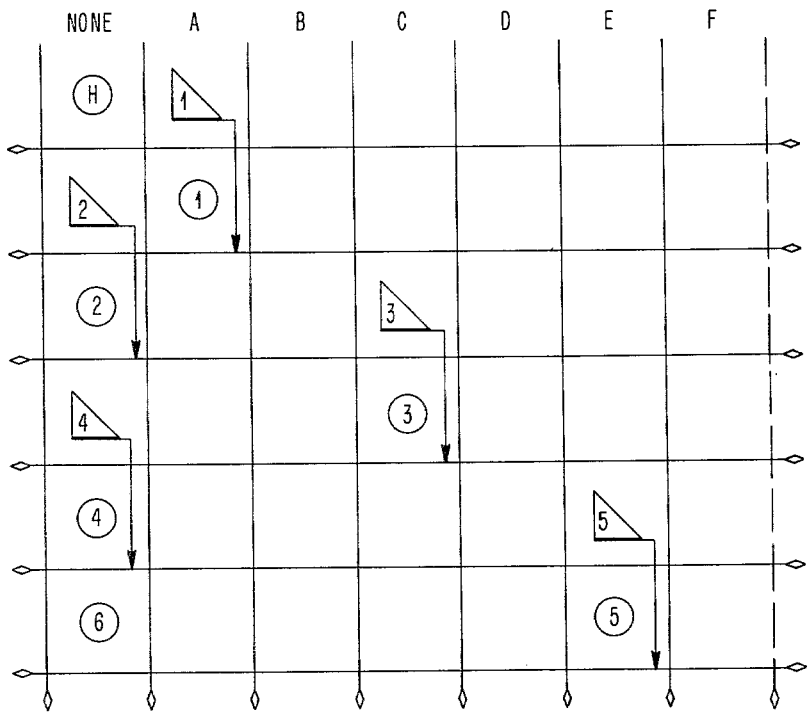
FIGS. 4–11 illustrate steps in the development of an ACE sequence flow table logic push button combination lock.

FIGS. 23a, 23b, and 23c illustrate a set of flow table logic circuits in thyratron transistor technology and their characteristics.

FIG. 24 is a schematic diagram of the pulse generator in thyratron transistor technology.

FIGS. 25a, 25b and 25c illustrate a set of flow table logic circuits in ferromagnetics technology and their characteristics.

FIG. 26 is a schematic diagram of the pulse generator in ferromagnetics technology.

DIRECT FLOW TABLE LOGIC

FIG. 1—Push button pulse generator flow table

A simple sequential device, the flow table of which appears in FIG. 1, is used to illustrate the several embodiments of the flow table logic DIRECTOR and RETAINER. The device is a pushbutton AB pulse generator. Three mechanically interlocked buttons designated R (Reset), A and B are used, each being adapted to remain operated, once depressed, until a different button is depressed. Two buttons are always up; one is always down. The pushbutons are assumed to operate switches at speeds compatible with the speed of the associated device.

The R button is initially down, preparing the device for operation by setting up stable state R. In operation, the A button is depressed, transferring stability to (1) via 1. The B button is then depressed, transferring stability to (2) via 2; the A button is again depressed, transferring stability back to (1) via 1. AB operation may then continue until power is turned off or until the device is reset by depression of the R button.

After a reset, the device must again be started by an AB sequence. If the B button is depressed during the reset state, stability transfers to (E) and the device produces an error signal. A power off, power on and reset sequence is required prior to another start without the error signal.

Similarly, if the device is reset while in stable state (1), neglecting the necessary final stable state (2), stability is transferred to stable state (E) in addition to the normal reset.

Fig. 2.—Neon-photoconductor flow table logic

This figure illustrates schematically a neon-photoconductor embodiment of the device according to FIG. 1 Flow Table. Each PC (photoconductor) is shown as a square marked with the alphameric designation of its logic, with the stable state or flow table RETAINER designation circled. For example PC R is in the flow table logic DIRECTOR for reset; PC R is in the flow table logic RETAINER for reset; PC 2 is in the flow table logic DIRECTOR for step 2; PC 1 is in the flow table logic RETAINER for step 1, etc.

Power supply 201 is connected via switch 202 to row bus 203, which is connected via column switches 204(R), 205(A) and 206(B) to column conductors 207, 208, and 209 respectively. Row conductors 210–214 traverse the column conductors at right angles, the conductors being mutually insulated. Neons 215–230 connect associated column and row conductors at their intercept points. Each neon is adapted to glow when the associated column switch and the power switch are closed and the associated row conductor is grounded.

Conductor 210 has a permanent connection through resistance 231 to ground 232 at one end. The other end is marked with a diamond 233, which indicates that the conductor ends without connections. Conductors 211–214 are "floating," both ends being terminated in diamonds; photoconductors 235–245, which face neons 215–225 respectively, are adapted to ground their associated row conductors when illuminated by their associated neons.

OPERATION

Power switch 202 is closed and switch R 204 is closed, connecting power through neon 215 to grounded row conductor 210. Neon 215 illuminates DIRECTOR photoconductor 235, which grounds row conductor 211, connecting power through switch R and column conductor R (207) through neon 216 through row conductor 211 and DIRECTOR R photoconductor to ground. Thus DIRECTOR R transfers stability from a built-in stable circuit (through neon 215 and conductor 210 to ground) to RETAINER R. The neon-photoconductor DIRECTOR is simply a switching device which grounds a designated column conductor upon excitation of its neon.

RETAINER R operates immediately upon grounding of its associated row conductor 211 via DIRECTOR R. Neon 216 is excited by the power circuit through switch R (204), through the neon to ground via conductor 211 and PC R (235). Once excited, it latches to ground via PC (R) (236).

Depression of Button A releases Button R and connects power via conductor A (208) to excite neon 217. The buttons may be make-before-break, but this is not necessary since the residual delay of PC (R) (236) is sufficient to retain ground on conductor 211 long enough to illuminate neon 217 in DIRECTOR 1. Neon 217, when excited, illuminates DIRECTOR 1 photoconductor 237, which grounds row conductor 212, providing a circuit to excite neon 218 in RETAINER 1. Neon 218 illuminates RETAINER 1 photoconductor 238, latching RETAINER 1 in its on stable state and thereby retaining ground potential on row conductor 212.

Depression of Button B releases Button A and connects power via column conductor B 209 to excite DIRECTOR 2 neon 219; neon 219 illuminates DIRECTOR 2 photoconductor 239, which grounds row conductor 213, providing a circuit to excite neon 220 in RETAINER 2. Neon 220 illuminates DIRECTOR 2 photoconductor 240, latching RETAINER 2 in its stable state and thereby retaining nominal ground potential on row conductor 213.

Depression of Button A releases Button B and connects power to column line A 208 to excite neon 221 in DIRECTOR 1. Neon 221 illuminates photoconductor 241 which grounds row conductor 212, providing a circuit to excite neon 218 in RETAINER 1. Neon 218 illuminates photoconductor 238, latching RETAINER 1 in its stable state, and thereby retaining nominal ground potential on row conductor 212. Thus a sequence of A–B–A–B button depressions is acceptable. Outputs may be taken from the various neons by photoconductors (not shown) or by visual derivation direct from the neons, or by a meter on the appropriate row conductor.

It is not acceptable to start the sequence with a B pulse. Accordingly, if the B button (206) is depressed during R, stability transfers via DIRECTOR E to RETAINER E which latches via photoconductor 245 to row conductor 214, through neon 225, column conductor 209, through column bus 203, switch 202 and power source 201 to ground. DIRECTOR E comprises neon 224 and photoconductor 244; RETAINER E comprises neon 225 and photoconductor 245. The RETAINER E neon 225 signals an error until the complete device is turned off by switch 202, after which a reset is required to resume operation.

It is similarly not acceptable to end a sequence with an A pulse unpaired with a following B pulse. DIRECTOR E, which comprises neon 247 and photoconductor 248, grounds row conductor 214 when Button R is depressed following button A, to operate RETAINER E.

SUMMARY—NEON-PHOTOCONDUCTOR

The neon-photoconductor RETAINER comprises a neon operator and a photoconductor operative. To set the RETAINER, potential is applied to the column electrode of the neon, coincidently with ground being applied to the row electrode of the neon, whereupon the neon operator operates its associated photoconductor operative. The RETAINER photoconductor operative, when illuminated, maintains nominal ground potential at the row electrode of the neon operator, thus latching the RETAINER.

The neon-photoconductor DIRECTOR similarly comprises a neon operator and a photoconductor operative. To initiate a DIRECTOR operation, potential is applied to the column electrode of the neon during a period of stability in which the row electrode of the neon is grounded whereupon the neon operates its associated photoconductor. The DIRECTOR photoconductor, when illuminated, applies ground to a row conductor, which normally causes illumination of a RETAINER neon at the intersection of the same column as the DIRECTOR neon and the row conductor to which the DIRECTOR photoconductor is connected.

*Fig. 3.—Direct flow table schematic*

Since there are only two building blocks, the DIRECTOR and the RETAINER, the direct flow table logic schematic is easily understood by persons familar with the flow table itself. The accepted symbol used in flow tables to designate a stable state is a circle 351 around the alphameric designation of the historical step involved. A circle, therefore, represents the RETAINER, with a designation inside labeling the step. The DIRECTOR is shown as a triangle 352 pointing to the right. Since the connection for a RETAINER is always the same, no attempt is made to show the connection in the schematic. The connection of the DIRECTOR is a line 353 extending the point of the triangle, terminating in a small arrow 354 at the row conductor 355 DIRECTOR-to.

Diamonds 356 indicate electrically floating ends of conductors; broken circles 357 indicate terminals at which the proper operating signals for the particular components to be used in the flow table logic are connected. The dotted lines are merely borders, which sometimes help make the drawing conform in appearance to a flow table.

Actual circuit design can most advantageously be worked out on a flow table logic chart having positions for logical elements preprinted in blank. The designer prepares a flow table, draws in RETAINER connections, and then draws in DIRECTOR connections to complete the diagram.

*FIG. 4—Combination lock flow table combination lock*

A combination lock is a sequential device which may be state das a flow table. The first digit becomes history when set; the second digit relies on correct past history and becomes history; the third digit relies on correct past history and unlocks.

To synthesize an opto-electronic combination lock having six push-buttons A–F which will unlock when the buttons are depressed in A–C–E sequence, each button being released prior to depression of the next, a flow table is generated as follows: There are six possible button choices in any one historical step—therefore, the flow table has seven columns of blocks, one for the home (no button) position, and one each for the six buttons A–F. The number of historical steps need not be calculated, since they develop naturally during the reduction of the problem to flow table form. However, the historical steps are as follows:

| Historical step | | Button depressed |
|---|---|---|
| 1 | (H) | None (Home position). |
| 2 | (1) | A. |
|   | (2) | None. |
| 3 | (3) | C. |
| 4 | (4) | None. |
| 5 | (5) | E. |
|   | (6) | Unlocked. |

There is an original stable state for the home position (no buttons—no history) for the lock, designated H in FIGS. 4 and 5. When the A button is pushed, a switching function 1 takes place, which immediately shifts stability to (1) for the remainder of the time that A is down. Historical step 1 lasts for the duration of the depression of buttons A. When the A button is allowed to return, the "no-button" column becomes active, and 2 transfers stability to (2) for the period during which no button is depressed. When C is depressed, stability is transferred to (3) via 3. When C is released, stability is transferred to (4) via 4. When E is depressed, stability is transferred to (5) via 5. When E is released, stability is transferred to (6). There is no need for a 6, since it is desired to stabilize (6) whenever (5) stabilizes. This is in accordance with the principles of merger as explained by Caldwell, Switching Circuits and Logical Design, Wiley and Sons, 1958, pages 470–479.

*FIG. 5—Combination lock—Unlock schematic*

The flow table of FIG. 4 is reduced to schematic form, with circles representing stable states (RETAINER in flow table logic) and with triangles representing unstable states (DIRECTOR in flow table logic).

The DIRECTOR-to connections are also shown. The exterior power circuits are not shown since there has as yet been designated no choice of componentry. Neon-photoconductor flow table logic circuits being ideally suited to the combination lock for convenience and economy reasons, the lock will be synthesized out of the neon-PC DIRECTOR and RETAINER blocks previously described.

Figure 6:
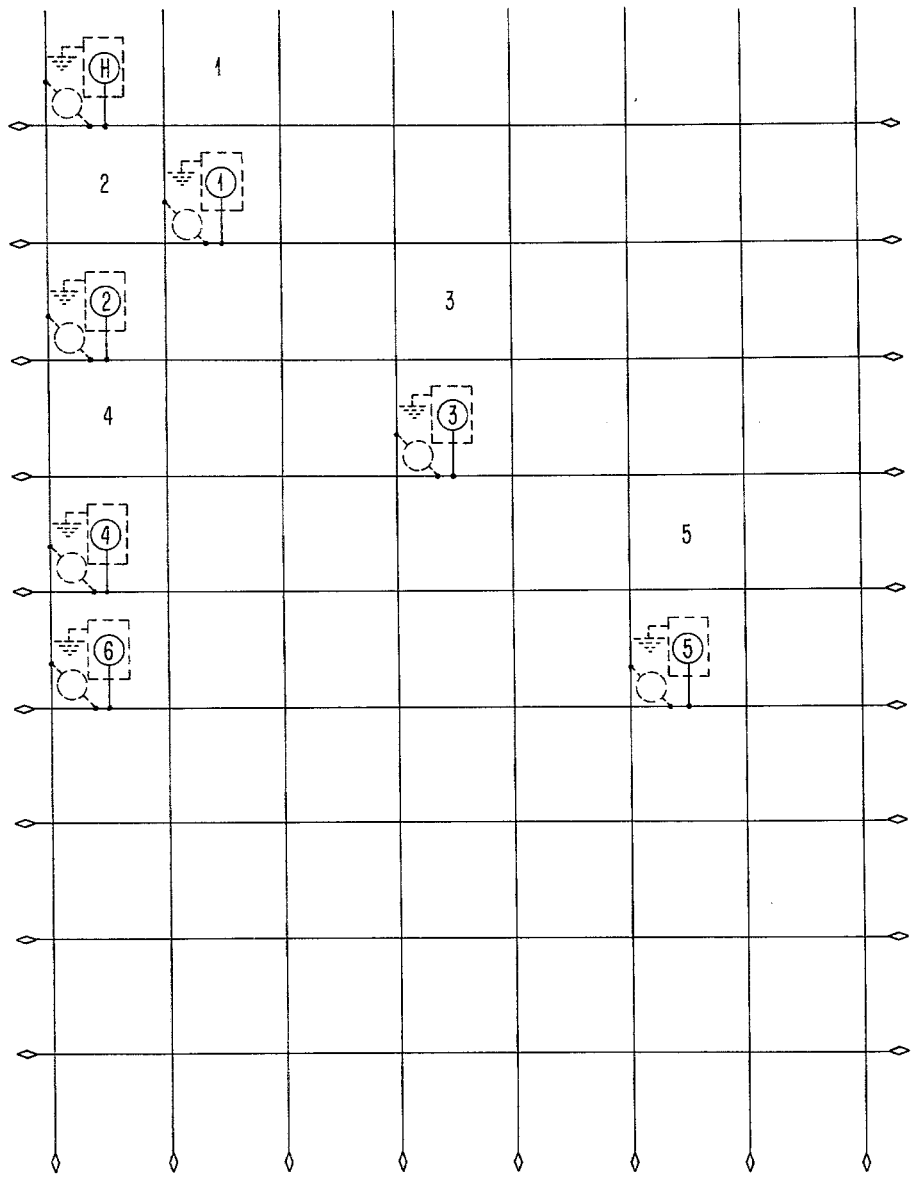
Figure 7:
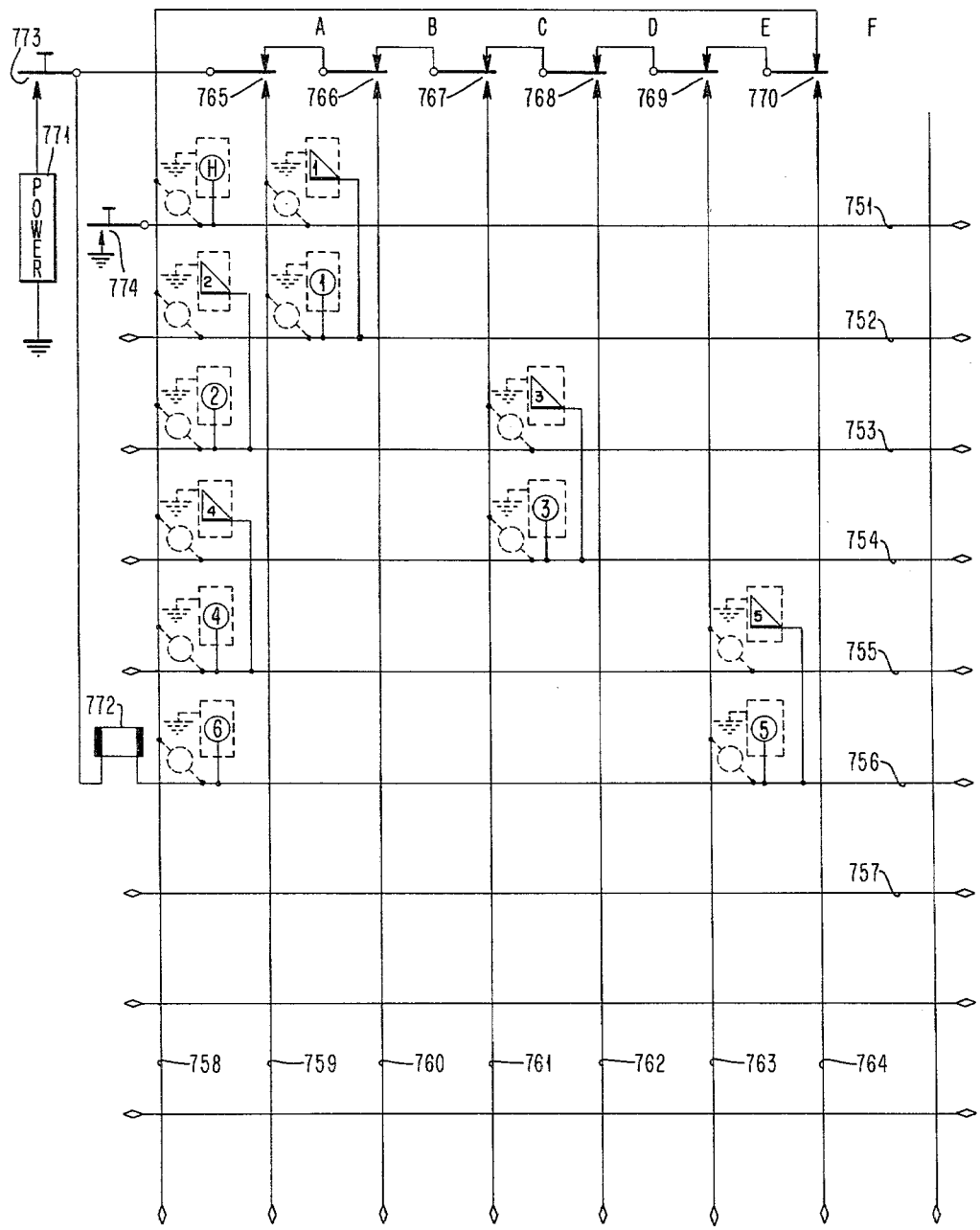

*FIGS. 6 and 7—Neon-photoconductor combination lock—Unlock diagram*

Neon-photoconductor latch RETAINER circuits are drawn into the designated RETAINER positions H, 1, 2, 3, 4, 5 and 6 of FIG. 5.

Step 1: The designer simply draws in the connections for the RETAINER circuits as shown in FIG. 6.

Step 2: Neon-photoconductor switch DIRECTOR circuits are drawn into positions 1, 2, 3, 4 5 and 6, which correspond to DIRECTOR arrows in FIG. 5. The DIRECTOR-to connections to the row lines are made completing the flow table logic of the unlock section of the combination lock.

The device is put into hardware in similar two-step fashion. In step 1, all the RETAINER connections (FIG. 6) are made; in step 2, all the DIRECTOR connections (FIG. 7) are made. The input switching and output devices are then connected to complete the device.

Power circuits are required to complete circuits from ground through the DIRECTOR or RETAINER photoconductors along row conductors 751–757, through the DIRECTOR or RETAINER neons along column conductors 757–764, through the operated one of the push-button switches to the ungrounded side of power source 771.

The unlock mechanism shown is a simple solenoid 772 in series with power source 771 and row line 756 which, under control of the neon operator in RETAINER 6, may be grounded by the PC in RETAINER 6. Switch 773 opens the power circuit when the door is opened; when the door is again closed the lock circuit is devoid of any condition of stability. Stability is then inserted into the RETAINER by momentarily grounding row line 751 via reset switch 774, which is inside the room guarded by the door and lock.

Figures 8, 9:
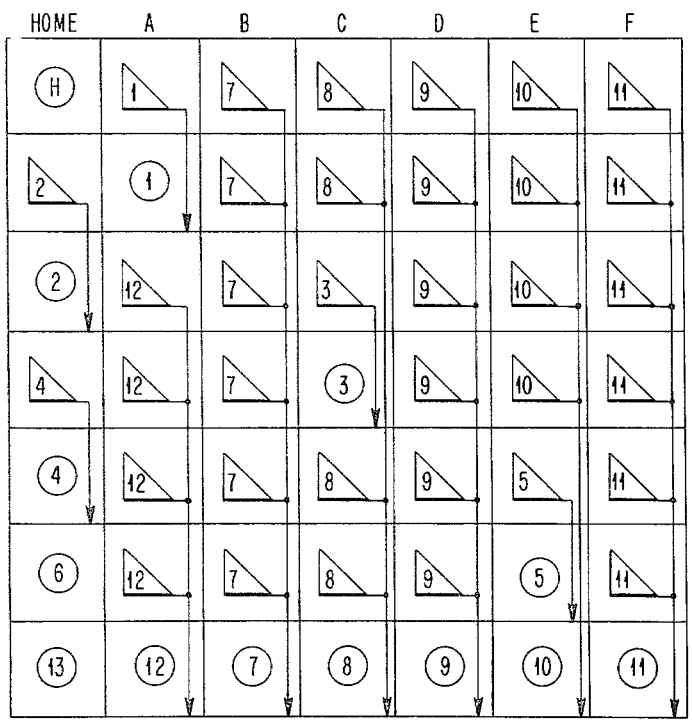

*FIGS. 8 and 9.—Combination lock alarm flow table and schematic*

The combination lock required safeguards against improper operation (such as depressing two buttons at once) and against trial and error methods. It therefore is desirable to synthesize an alarm structure to cooperate with the unlock structure of FIG. 7 (flow table FIG. 4). The FIG. 4 unlock flow table is used as a work sheet.

It is desired to operate the alarm as a result of infractions of the unlock sequence or coincident depression of buttons. An alarm row conductor 757 was included in FIG. 7 but not connected; it is therefore permissible to include an alarm row of blocks. Since depression of any but the A button at step H is an infraction, unstable state numbers are designated for each of the remaining blocks 7, 8, 9, 10 and 11 in row H. Each of these unstable states is required to transfer stability to the alarm row, in which stable functions (7), (8), (9), (10) and (11) appear in columns corresponding to their designation. Step 1 is the stable state for proper depression of the A button. If any other button is depressed in step 1, immediate transfer of stability to the alarm row is required. Unstable states are designated 7, 8, 9, 10 and 11, since the desired recipients of alarm stability have been previously designated (7), (8), (9), (10) and (11). Step 2 is the stability condition after proper depression and release of the A button. In step (2) depression of any but the C button is an infraction. Alarm stability designations (7), (9), (10) and (11) are in place to accept transfer of stability should buttons B, D, E or F be depressed; unstable states 7, 9, 10 and 11 are therefore marked. Depression of the A button is also an infraction; stable state (12) and unstable state 12 are marked. All the remaining blocks in the flow table rows 3, 4 and 6 (unlock) are marked with the designation for unstable states to transfer stability to the alarm row. A final alarm stable state 13 is provided in the no-button column to retain alarm stability permanently until the door is opened from the inside.

Figure 10:
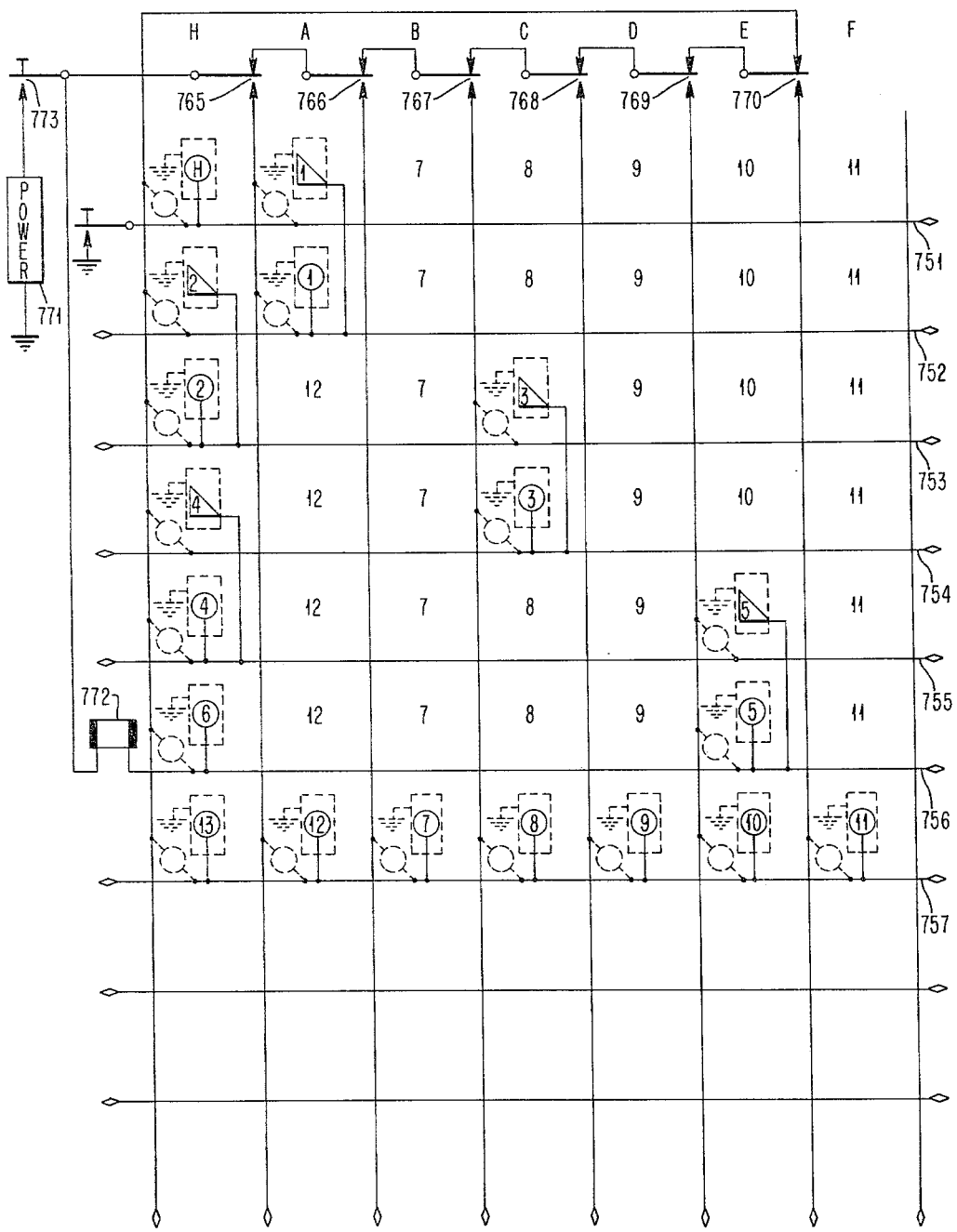
Figure 11:
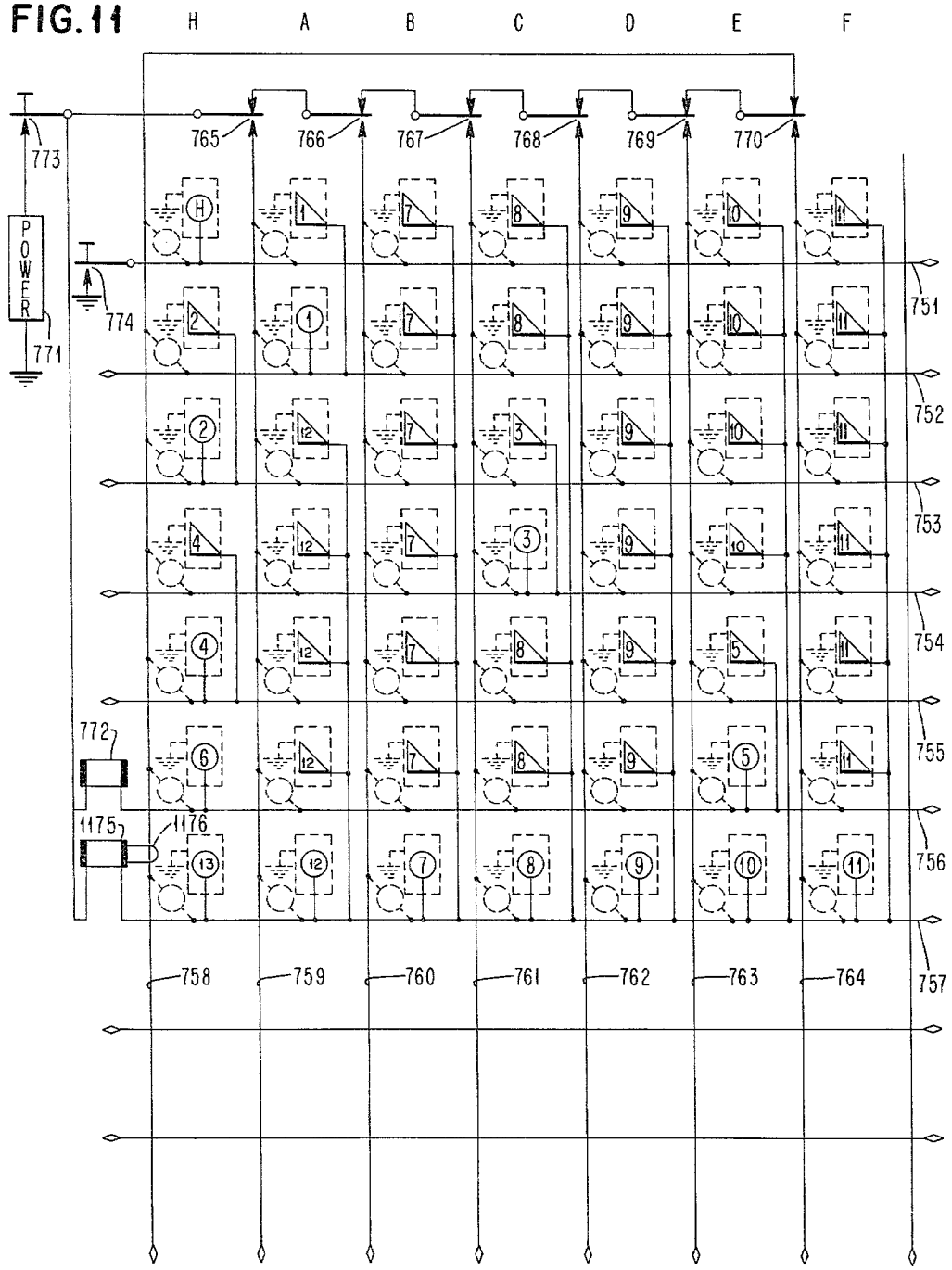

*FIGS. 10 and 11.—Combination lock and alarm diagrams*

The alarm diagram, like the alarm flow table and schematic, is superimposed over the combination lock unlock diagram. FIG. 10 illustrates step 1, where flow table logic RETAINER circuits 7, 8, 9, 10, 11, 12 and 13 are connected into the circuit of FIG. 7. FIG. 11 illustrates step 2 where the flow table logic DIRECTOR circuits, which fill all the remaining blocks, are connected to row line 757 to complete the combination lock and alarm structure.

Alarm solenoid 1175 operates bolt 1176 which holds the door locked regardless of whether or not the unlock sequence was completed to operate unlock solenoid 772. The alarm is resettable by a manual tripping of the bolt and door unlock operation, and opening of the door to open switch 773. If necessary, suitable power amplifiers may be inserted into the solenoid circuits.

*FIG. 12.—ELPC flow table logic*

Figure 12A:
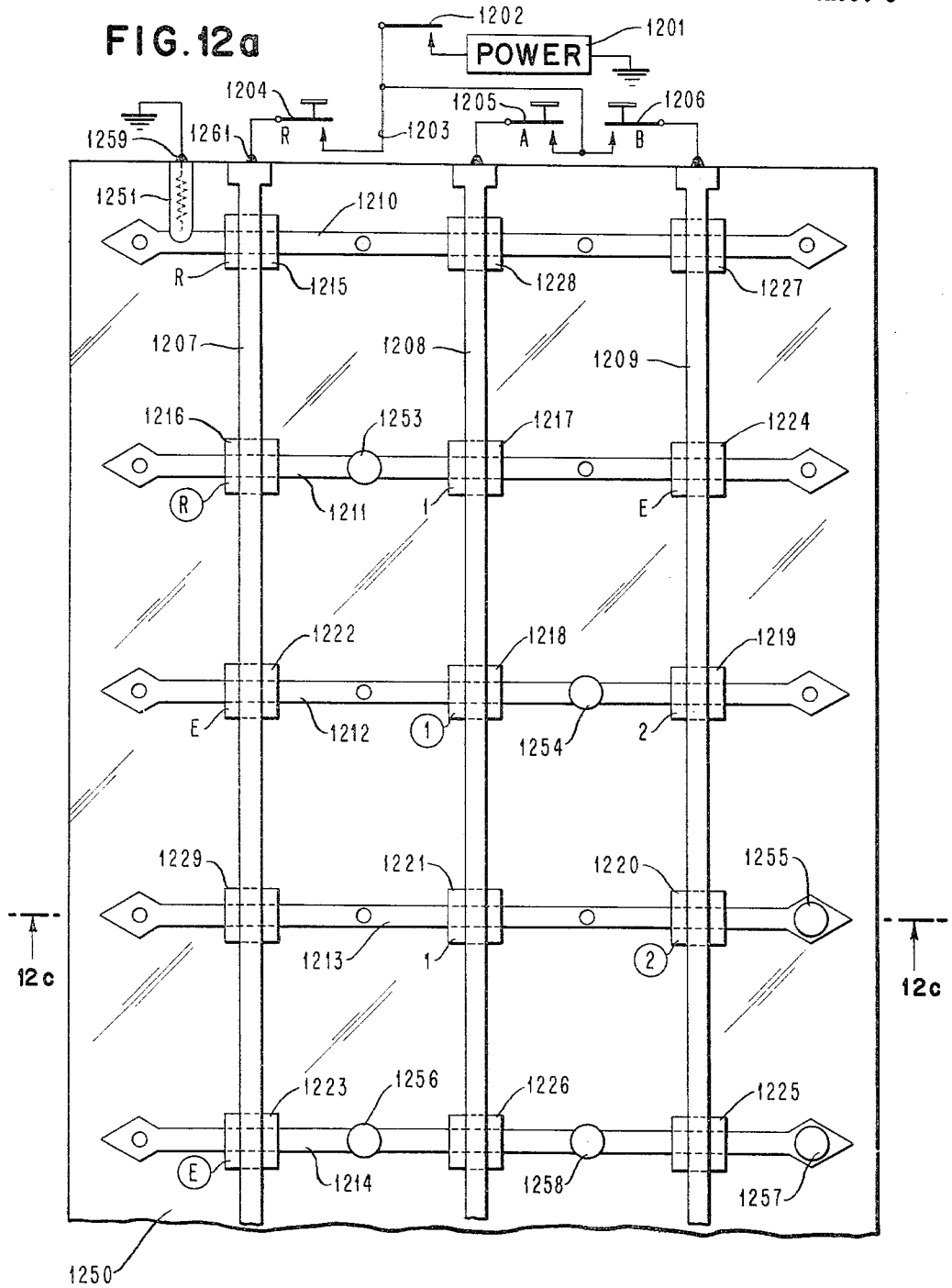
FIGS. 12a, 12b and 12c illustrate the push-button pulse generator of FIGS. 1 and 3 in electroluminor-photoconductor technology.

The structural limitations of flow table logic are few— the two-dimensional quality of the table, however, makes the flow table logic structure adapt harmoniously to printed circuit techniques. The system of electroluminors (EL's) paired with photoconductors (PC's) is doubly advantageous in that the active elements of a switching structure may be printed as well as the conductive (passive) elements. The flow table schematic of FIG. 3 illustrates a workable device in which ELPC DIRECTOR circuits and RETAINER circuits are usable. FIG. 12 illustrates an ELPC embodiment of the AB pulse generator of FIGS. 1, 2 and 3. FIG. 12a illustrates the electroluminor array which is formed upon a glass EL plate 1250. The similarity to FIG. 2 is shown by similar reference characters. Power source 1201 is connected via a switch 1202 to column bus 1203 which is connected via push-button column switches 1204(R), 1205(A) and 1206(B) to column electrodes 1207, 1208 and 1209 respectively. Row electrodes 1210 to 1214 traverse the column electrodes at right angles, the electrodes being composed of a transparent conductor such as tin oxide and mutually insulated by EL phosphor areas 1215 through 1226 which appear at intersections of the column conductors and row conductors. The EL phosphor areas are adapted to luminesce when the associated columns switch and the power switch are closed and the associated row line is grounded, impressing power source voltage across the phosphor areas. Row conductor 1210 has a permanent ground at the left end through resistance 1251. The other end is terminated, without connection, in a diamond. Electrodes 1211 through 1214 are "floating," both ends being unconnected. Heads of rivets 1253–1258 are shown.

Figure 12B:
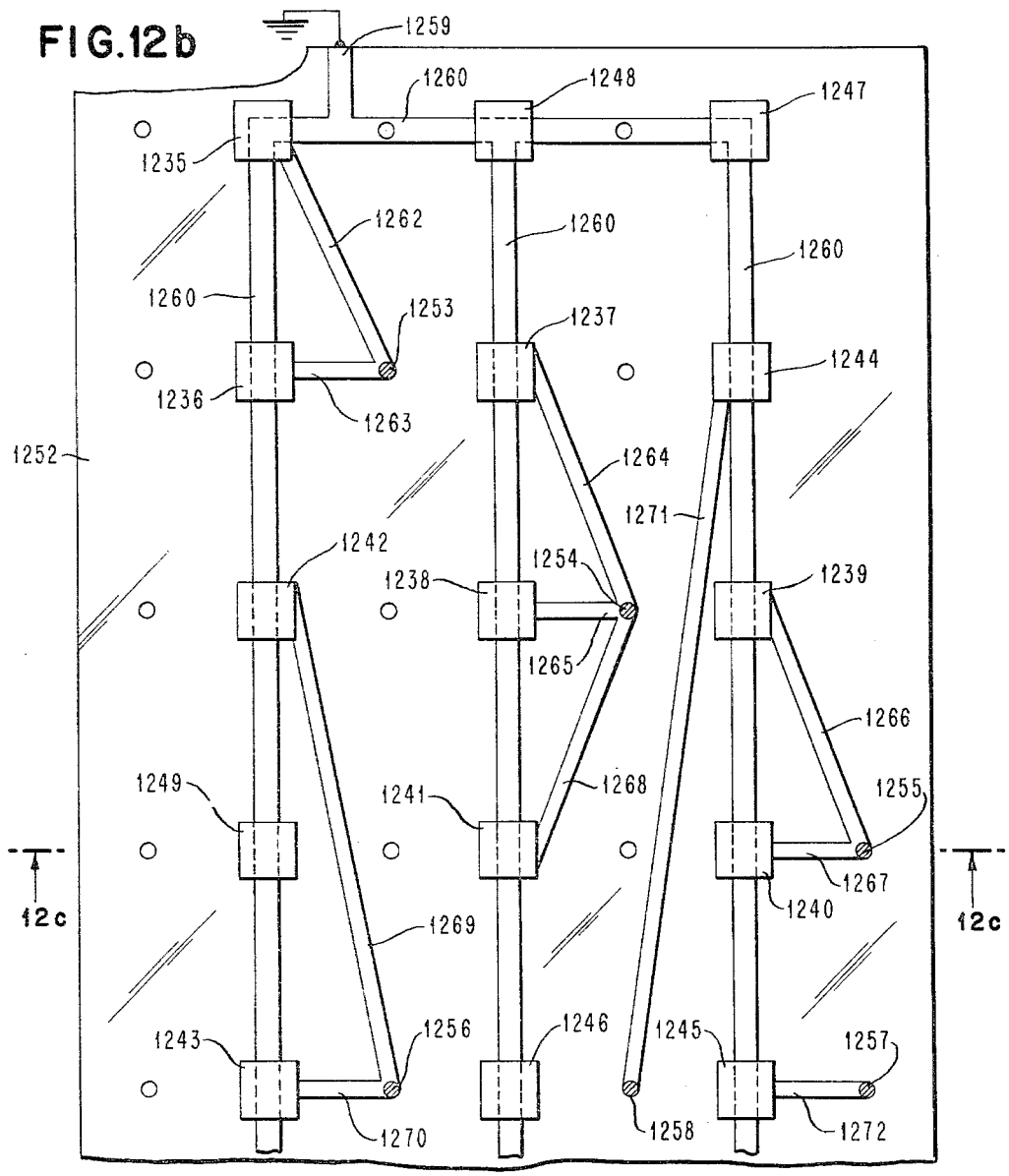

FIG. 12b illustrates PC plate 1252 which may be of glass, upon which connectors and PC's are arrayed. Plate 1252 is fastened to plate 1250 by rivets 1253–1258, which additionally provide electrical connections from EL plate to PC plate.

Photoconductors 1235–1246, shown in FIG. 12b, face respective EL phosphor areas 1215 through 1226, optically coupled through glass plate 1250 in such manner that luminance from an EL area effectively changes the resistance of its related PC from non-conducting to conducting. Each PC is designated by a reference character twenty units higher than that of its related EL (EL 1217 operates PC 1237, for example).

One side of each PC is connected to ground via connector 1259 and conductor 1260. When, for example, EL 1215 (FIG. 12a) is made luminant by a circuit from ground through power unit 1201, main power switch 1202 column bus 1203, R button 1204, connector 1261, R column electrode 1207, EL 1215, row electrode 1210, resistance 1251 and connector 1259 back to ground, PC 1235 is rendered conductive, completing a conductive path (FIG. 12b) from ground through connector 1259 and conductor 1260, through the PC itself to DIRECTOR–to– R connector 1262 through rivet 1253 to row electrode 1211 (FIG. 12a). Ground thus applied to row electrode 1211 completes a circuit from ground through power unit 1201, main power switch 1202, column bus 1203, R button 1204, connector 1261, R column electrode 1207 and EL 1216 to ground potential at row electrode 1211. This DIRECTOR circuit causes EL 1216 to luminesce, which renders PC 1236 conductive to latch row electrode 1211 at ground potential via connector 1259 (FIG. 12b), conductor 1260, PC 1236, RETAINER-R conductor 1263 and rivet 1253 to row electrode 1211 (FIG. 12a). EL 1216 and PC 1236, with related conductors, form RETAINER R. EL 1215 and PC 1235, with related conductors, form the DIRECTOR R to provide the initial R condition of stability by conditioning RETAINER R whenever R button 1204 is depressed.

During stability in the R step, row electrode 1211 remains at ground and EL R (1216) remains luminant.

Figure 12C:
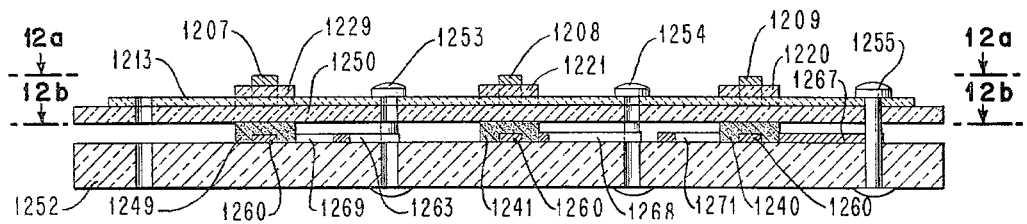

FIG. 12c illustrates the assembled structure. EL plate 1250 is held to PC plate 1252 by rivets (of which 1255 appears with 1253 and 1254 in the background). Row electrode 1213 (sectioned lengthwise) appears as a strip on the face of the plate; EL's 1229, 1221, and 1220 overlay row electrode 1213; the ends of column electrodes 1207, 1208 and 1209 (sectioned crosswise) overlie the EL's, which insulate the electrodes from one another. When a power circuit is completed between the row electrode 1213 and, for example, a column electrode 1208, potential is impressed across phosphor layer 1221, which luminesces to illuminate PC 1241. Illumination of PC 1241 connects grounded conductor 1260 to DIRECTOR-1 conductor 1268 (which in FIG. 12b connects ground through rivet 1254 to row electrode 1212.) Conductors 1269 and 1271 also appear in FIG. 12c.

OPERATION OF ELP A–B PULSE GENERATOR

With the R-button down, stability resets in RETAINER R and row electrode 1211 is latched at ground potential. In the usual proper operation, push button A is operated first, connecting power from ground through power unit 1201, main power switch 1202, column bus 1203, A button switch 1205, column electrode 1208 and EL 1217 to grounded row electrode 1211. EL 1217 luminesces, rendering PC 1237 (FIG. 12b) conductive. Ground potential is then connected through grounded connector 1259, grounded conductor 1260, PC 1237, DIRECTOR 1 conductor 1264 and a rivet 1254 to row electrode 1212 (FIG. 12a). RETAINER 1 thereupon becomes operative (FIG. 12a) as follows: power is connected from ground through power unit 1201, main power switch 1202, column bus 1203, A button 1205, A column electrode 1208, EL 1218, to row electrode 1212 which is at ground potential. EL 1218 becomes luminant, illuminating PC 1238 (FIG. 12b), which thereupon connects ground potential to the row electrode 1212 end of the circuit (FIG. 12b) as follows: ground through grounded connector 1259, grounded conductor 1260, PC 1238, RETAINER 1 conductor 1265 and rivet 1254 which connects through glass plate 1250 to row electrode 1212 (FIG. 12a). Optical feedback from EL 1218 to related PC 1238 provides the latch necessary for the RETAINER 1 so long as A button 1205 remains down.

When the B button is pushed, the A button opens, and power is connected to the DIRECTOR 2 circuit EL 1219 from ground through power unit 1201, main power switch 1202, column bus 1203, B button 1206, B column electrode 1209 and EL 1219 to ground potential on row electrode 1212, causing DIRECTOR 2 EL 1219 to luminesce. This illuminates related PC 1239 (FIG. 12b). PC 1239 connects ground potential to row electrode 1213 (FIG. 12a) by the following circuit (FIG. 12b); ground through grounded connector 1259, grounded conductor 1260, PC 1239, DIRECTOR 2 conductor 1266, rivet 1255 through glass plate 1250 (FIG. 12a) to row electrode 1213. EL 1220 luminesces, illuminating PC 1240 (FIG. 12b). This connects ground via RETAINER 2 conductor 1267 and rivet 1255 through plate 1250 (FIG. 12a) to row electrode 1213 to form the regenerative latch RETAINER 2 circuit.

If the A push button is next operated, applying potential across electrodes 1208 and 1213, EL 1221 becomes luminant, applying ground (FIG. 12b) through PC 1241, DIRECTOR 1 conductor 1268, rivet 1254 through glass plate 1250 (FIG. 12a) to row electrode 1212. So long as the A–B sequence of push buttons is continued, stability transfers from RETAINER 1 (row electrode 1212) to RETAINER 2 (row electrode 1213).

The simple rules require a complete A–B sequence; it is erroneous to follow the A push button with the R push button or to follow the R push button with the B push button. If the A push button is down, stability rests in RETAINER 1, which latches row electrode 1212 at ground potential. If the operator erroneously pushes the R button, power is connected to DIRECTOR E EL 1222 from ground through power unit 1201, main power switch 1202, column bus 1203, button 1204, column electrode 1207 and EL 1222 to ground potential on row electrode 1212, causing EL 1222 to luminesce and illuminate PC 1242 (FIG. 12b). PC 1242 connects ground through grounded connector 1259, grounded conductor 1260, PC 1242, DIRECTOR E conductor 1269 and rivet 1256 through glass plate 1250 (FIG. 12a) to E row electrode 1214. Power unit potential remains on column electrode 1214 (FIG. 12a), latching the RETAINER E for the error stability condition.

Similarly, should the push button pulse generator be in the reset stability condition, with RETAINER R latched, and should the B push button be operated, DIRECTOR E EL 1224 would luminesce, illuminating PC 1244. Ground potential passes to PC 1244 and DIRECTOR E conductor 1271 and rivet 1258 through the glass to row electrode 1214, thereby applying generator potential across electrodes 1209 and 1214 to operate RETAINER E EL 1225, which illuminates PC 1245 (FIG. 12b), thereby connecting ground through PC 1245 and RETAINER E conductor 1272 and rivet 1257 to latch row electrode 1214 at ground potential.

DIRECT FLOW TABLE LOGIC REVIEW

The flow table statement of a sequential switching problem is reduced to stable state and unstable state designations in appropriate blocks of the flow table. Row conductors and column conductors, mutually insulated, form a matrix with an intercept point for each flow table block. RETAINER circuits are applied at intercept points for stable state designated blocks, DIRECTOR circuits are applied at unstable state designated intercept points. Stability shifts from RETAINER to RETAINER (row to row) are controlled by column switches which condition single column conductors and by a DIRECTOR circuit in the row of momentary stability.

PRIMED FLOW TABLE LOGIC

*FIG. 13.—Push button pulse generator schematic*

The symbols are a circle for the RETAINER and a triangle for the DIRECTOR just as in the direct flow table schematic of FIG. 3. RETAINER connections, being the same for every RETAINER, are omitted. DIRECTOR connections, however, are shown as lines terminating in arrowheads on the left sides of the related RETAINER circles. This connection biases the related RETAINER circuits for operation upon the next stimulus appearing on the column line.

FIG. 13 illustrates a straightforward interpretation of the primed flow table. In each stable state row, one or more DIRECTOR circuits are conditioned as a result of the conditioning of the row line by the related RETAINER circuit. Each DIRECTOR circuit is effective to precondition (prime) the related RETAINER circuit which appears in the same column. Where there are plural DIRECTOR circuits in any particular row, each DIRECTOR circuit pre-conditions its related RETAINER circuit; the final selection of RETAINER circuit is by a stimulus along the column line related to the selected RETAINER circuit, which in turn is controlled by the column switch.

FIG. 14 illustrates field effect transistor flow table logic RETAINER and DIRECTOR circuits. PN field effect transistors are heavily doped three-electrode PN semiconductors in which conduction from one electrode in the N region to the other electrode in the N region is controlled by the effect of a field impressed on the P region, by a single electrode. A high potential field from the P region permeates the N region and "pinches off" current through the N region; a low potential field shrinks toward the P region, allowing conduction through the vacated portion of the N region. NP field effect transistors operate similarly under conditions of opposite polarity.

The RETAINER circuit includes PN transistor 1450 and NP transistor 1451 in latch configuration. Each transistor is biasable for conduction by a ground potential conditioning signal. Ground potential (broken line in the chart) applied to conditioning input 1452 coincident with ground potential applied to column input 1453 produces conduction through transistor 1450. Output terminal 1454, normally held at +V, falls to ground potential.

The latch is set up as point 1455 reaches ground potential, biasing transistor 1451 for conduction. Transistor 1451 conducts from ground along a feedback line to point 1456, maintaining the field of transistor 1450 at ground (solid line in chart) after the conditioning input on terminal 1452 is removed.

FIG. 14b shows voltage levels during operation of the circuits of FIG. 14a. Conditioning input 1452 drops to ground potential (broken line) and is quickly latched to ground potential (solid line); column input 1543 remains at ground potential during this period. Point 1454 drops to ground potential as transistor 1450 conducts; the connection to line 1457 and DIRECTOR transistor 1461 input 1462 provide ground level. NP transistor 1461 converts to the 0–V voltage range to operate other RETAINER circuits.

Row conductor 1457 is maintained at ground potential by the RETAINER circuit. In the DIRECTOR circuit, NP transistor 1461 is biased for conduction by the ground potential from row conductor 1457 applied to conditioning input 1462. Output terminal 1463 rises from its normal −V potential to ground. The DIRECTOR circuit provides proper polarity of potential swing and necessary isolation. DIRECTOR output 1463 is connected to the conditioning input of the appropriate succeeding RETAINER circuit. Schematic designations of RETAINER circuit 1464 and DIRECTOR circuit 1465 appear in FIG. 14c.

FIG. 15.—Field effect transistor pulse generator

FIG. 15 illustrates field effect transistor flow table logic DIRECTOR and RETAINER circuits in the AB pulse generator environment.

Power source 1501 produces ground potential and +V. Ground potential being the operative signal, main power switch 1502 is in the ground potential line to column bus 1503 and column switches 1504–1506. The column switches are interlocked for one-at-a-time operation from +V to ground. Column conductors 1507–1509 are thus switched from +V normal potential to ground potential when the respective column switch is operated.

Column switch 1504 is assumed to be operated when the main power switch is closed. Ground potential from column conductor 1507 on the column input (with ground potential continuously applied to the conditioning input of RETAINER R) sets and latches RETAINER R 1550, which lowers the potential on row conductor 1511 to ground potential.

Ground potential applied to the conditioning inputs of DIRECTOR 1 1551 and DIRECTOR E 1552 biases their NP field effect transistors for conduction; the DIRECTOR circuit outputs rise from −V to ground potential. DIRECTOR 1 1551 output connects to RETAINER 1 1553; DIRECTOR E 1552 output connects to RETAINER E 1554. In normal operation, A column switch 1505 operates following reset and stability transfers to RETAINER 1, which is set by ground potential on both conditioning input and column input. Should the B column switch 1505 be operated following the reset, stability transfers similarly to RETAINER E 1554.

During the period of RETAINER 1 stability, row conductor 1512 remains at ground potential as do both inputs and outputs of DIRECTOR E 1555 and DIRECTOR 2 1556, which condition RETAINER E 1557 and RETAINER 2 1558, respectively. In normal operation, stability transfers to RETAINER 2 1558 as B column switch 1506 grounds B column conductor 1509. The conditioning input of RETAINER 2 1558 being grounded by DIRECTOR 2, RETAINER 2 1558 is set as its column input is grounded.

During retention of stability in row 2, (ground potential on row conductor 1513) there is no error possibility since either reset or another AB sequence is valid. The row 2, column R block is empty. Reset occurs in the normal fashion should button R be depressed. DIRECTOR 1 1559 is operative to return stability to RETAINER 1 should button A be depressed.

The AB sequence may be repeated indefinitely, during which time stability moves from RETAINER 1 1553 to RETAINER 2 1558 via DIRECTOR 2 1556 and back to RETAINER 1 1553 via DIRECTOR 1 1559.

Figure 16:
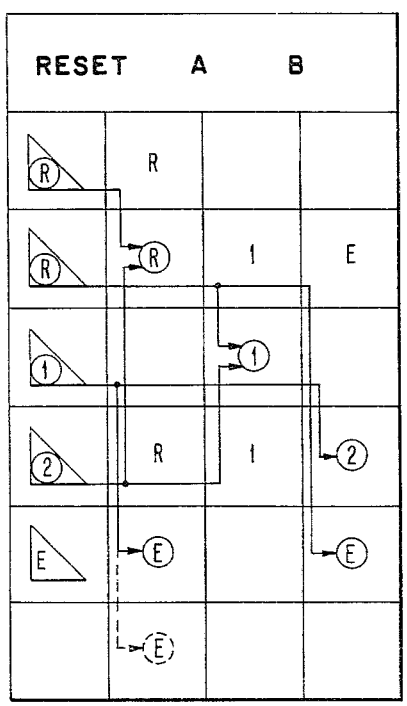
FIG. 16 is a schematic chart of the pushbutton pulse generator of FIG. 1 in optimized primed flow table logic.

FIG. 16.—Optimized primed flow table logic

The flow table logic push button pulse generator of FIG. 13 is not optimized for most technologies. In primed flow table logic it is usually possible for a single DIRECTOR circuit to precondition all the possible RETAINER circuits to which stability might be transferred. FIG. 16 illustrates such an optimized primed flow table logic AB pulse generator, in which four DIRECTOR circuits do the work of the seven DIRECTOR circuits in FIG. 13. Certain rules for applying hardware to primed flow table logic circuitry will become apparent as the designer becomes familiar with the technology. For example, in using certain components, it is not practicable to have more than one RETAINER circuit in any one row; that is, it may be impossible to transfer conditioned stability from a conditioned RETAINER to a deconditioned RETAINER in the same row. The delay characteristics of the component also at times require special treatment to prevent loss of stability.

Figure 17B:
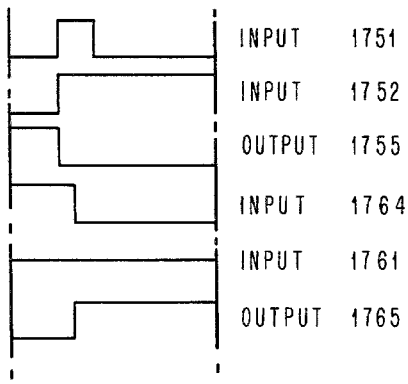
FIGS. 17a, 17b and 17c illustrate a transistor set of flow table logic circuits and their characteristics.
Figure 17C:
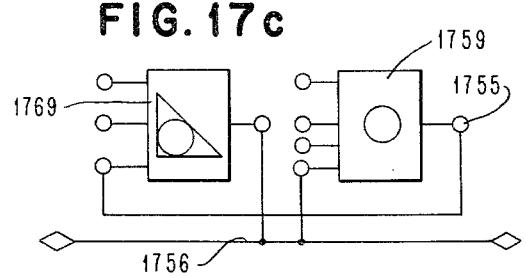
Figure 17A:
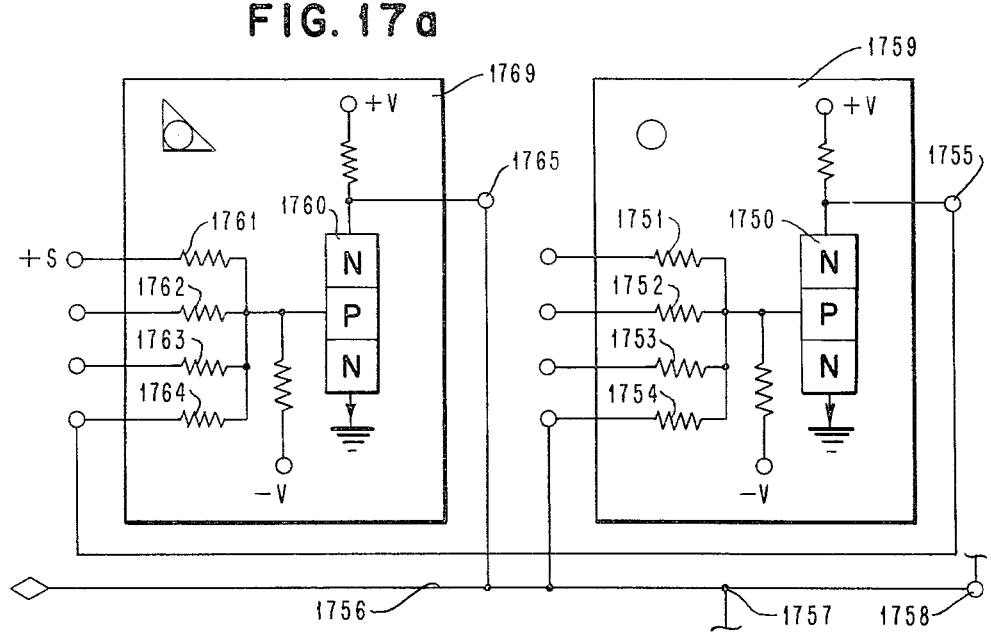
Figure 18:
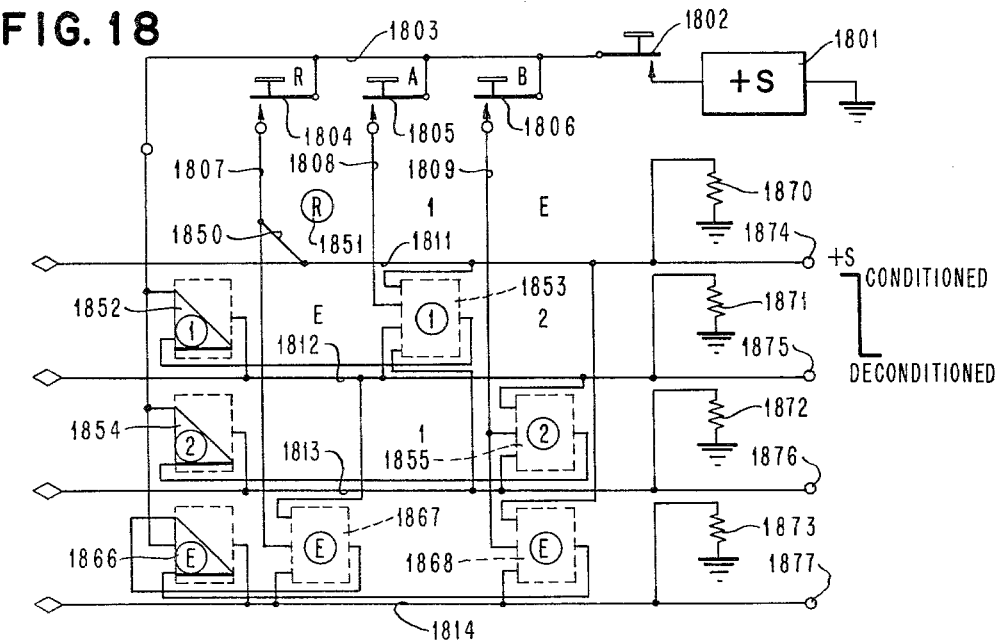
FIG. 18 is a schematic diagram of the pulse generator in transistor semiconductor technology.

FIGS. 17–18.—Transistor flow table logic AB pulse generator

A simple primed flow table logic circuit can be prepared using a single four input NPN transistor block shown in FIG. 17a. Transistor 1750 forms the RETAINER circut; it is biased to conduct when two or more of its inputs 1751–1754 are positive. The output at terminal 1755 is inverted so that when two inputs are positive, transistor 1750 conducts, lowering the output to ground potential, or when less than two inputs are positive, transistor 1750 is cut off and the output is at +S level. Identical transistor blocks form both DIRECTOR and RETAINER circuits. A single DIRECTOR circuit is allotted to each row, and suitably connected with one or more RETAINER circuits in the row with feedback to form a latch. The DIRECTOR circuit includes transistor 1760 which is biased by input 1761, a steady +S, to conduct when one or more of inputs 1762–1764 is positive. When an input 1762–1764 is positive the output at terminal 1765 is at ground potential; when less than two inputs are positive the output is at +S level.

Latching of the RETAINER circuit and its related DIRECTOR circuit occur as follows as shown in FIG. 17b.

(1) Transistor 1750 is cut off—terminals 1755 and 1764 are at +S. Transistor 1760 is conducting—terminal 1765 and row conductor 1756 are at ground.

(2) Two inputs (1751–1752 in diagram) of transistor 1750 are conditioned by +S signals.

(3) Transistor 1750 conducts—terminal 1755 potential falls to ground, deconditioning input 1764 of transistor 1760.

(4) Transistor 1760 is cut off—terminal 1765 potential rises to +S, conditioning row conductor 1756 and input 1754 of transistor 1750.

(5) Input 1751 is deconditioned. Transistor 1750 continues to conduct, however, since inputs 1752 and 1754 are conditioned.

Row conductor 1756 is tapped at points 1757 and 1758 for row output. The row output controls work circuits and preconditions a RETAINER circuit in another row to which stability may next be transferred.

FIG. 17c shows the schematic related to FIG. 17a.

FIG. 18.—Transistor AB pulse generator

FIG. 18 illustrates an A–B pulse generator according to the schematic of FIG. 16, using the transistor technology of FIG. 17. The source of voltage at level +S is designated 1801, the main power switch 1802, column bus 1803, R switch 1804, A switch 1805 and B switch 1806. Column lines 1807–1808–1809 cross row lines 1811–1814 providing intercept points across which the flow table ogic DIRECTOR and RETAINER circuits are connected.

Since the requirements of the pulse generator are simple, it is possible to condition the R-row conductor 1810 directly upon closing the reset switch 1804. Conductor 1850 accomplishes this function. The R-row conductor 1811, when energized, makes a +S signal available along its length. An unstable state, designated by the 1 in the A column R-row, authorizes a conditioning connection to the input of the 1 stable state directly beneath it in the A row. Similarly, an E unstable state in B-column R-row authorizes a conditioning connection to the input of the related RETAINER E which appears three rows down in B-column. RETAINERS 1 1853 and E 1868 are primed to take and maintain conditioned stability upon closure of the related column push-button which makes +S available to their respective inputs.

In normal operations, depression of the A button follows a reset. Such depression of the A button transfers stability to the 1 row by coincidently conditioning two inputs of RETAINER 1 1853, whereupon the output RETAINER 1 falls to zero level, deconditioning DIRECTOR 1 1852. The output of DIRECTOR 1 1852 rises to +S and conditions row conductor 1812. Row conductor 1812 is connected to a third input to RETAINER 1 1853, which with A column conductor 1808 maintains the RETAINER 1 1853 transistor conducting after the input from row conductor 1811 falls. DIRECTOR 1 1852 and RETAINER 1 1853 form a latch.

In normal operation the next step is the closure of the B switch which transfers stability to RETAINER 2 1855 and row conductor 1813 in similar fashion. DIRECTOR 1 1852 maintains row conductor 1812 conditioned which applies conditioning voltage to RETAINER 2 1855 and also to the RETAINER E 1867 in the R column. As the B-button is depressed, B-column conductor 1809 is conditioned. Two inputs being conditioned, RETAINER 2 1855 transistor conducts, deconditioning one input of DIRECTOR 2 circuit 1854. DIRECTOR 2 1854 transistor cuts off, conditioning row 2 conductor 1813.

Stability is transferred back to row 1 by depression of A-button 1805. The second and fourth inputs to the RETAINER 1 1853 transistor are then conditioned—RETAINER 1 1853 conducts and latches with DIRECTOR 1 1852 as previously described.

With stability in row 1, it is error to push the R-button, which would omit the final B pulse of the AB—AB sequence. DIRECTOR 1 1852 maintains row 1 conductor 1811 conditioned, preconditioning (priming) RETAINER E 1867. Depression of R-button 1804 conditions RETAINER E 1867, transferring stability to row E and maintaining row E conductor 1813 conditioned.

Output load resistors 1870–1873 and output terminals 1874–1877 provide control voltages to the external work circuits which utilize the flow table logic AB pulse generator.

Figure 19:
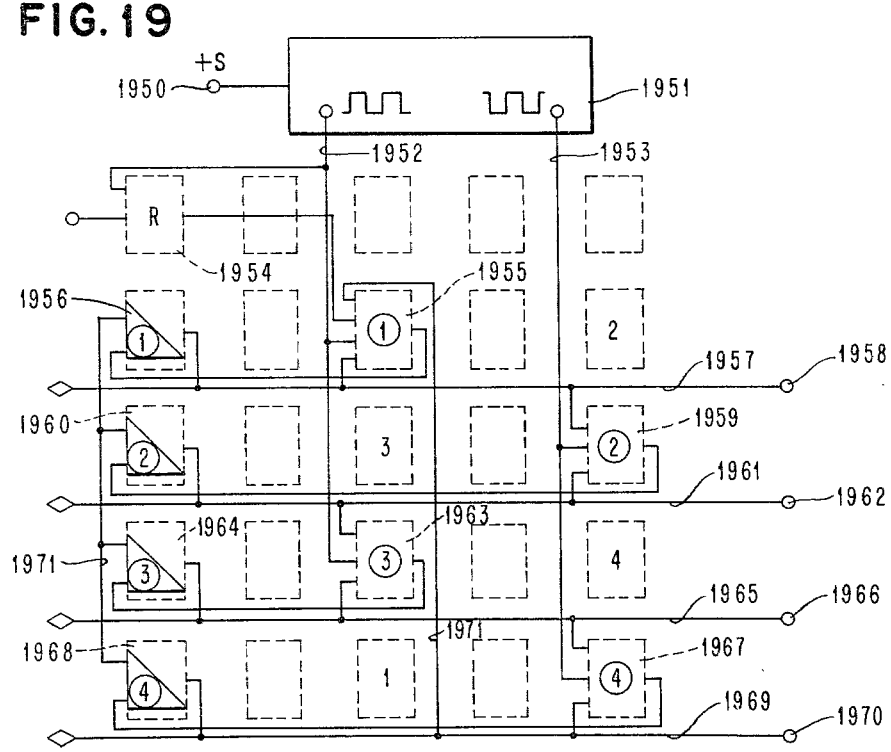
FIG. 19 is a schematic diagram of a four-stage ring using primed flow table logic and transistor technology.

FIG. 19.—Four stage ring

FIG. 19 illustrates a four-stage ring in primed flow table logic using the two-out-of-four input transistor DIRECTOR and RETAINER circuits shown in FIG. 17.

The ring circuit is drawn on a flow table chart for convenience. The flow table is first generated as follows: Stability is to be inserted via a reset mechanism R into (1). Stability next transfers to (2) via 2; thence to (3) via 3; and to (4) via 4. Stability then transfers back to (1) via 1. The inscribed-circle-triangle designation of the primed flow table DIRECTOR is placed in a special column at the left. The latching connections are made; that is, the output of each RETAINER is connected to its related DIRECTOR, the output of each DIRECTOR is connected to the related row conductor, and the row conductor is connected to the fourth input of the RETAINER.

Terminal 1950 is connected to a source of potential at +S voltage. Multivibrator 1951, power by +S at terminal 1950, produces complementary square waves on column conductors 1952 and 1953.

Initial phasing of the rings is controlled by R switch 1954, which conditions the second input to RETAINER 1 1955 coincidently with conditioning of column conductor 1952. The R switch may take various forms so long as it produces a conditioning signal to operate RETAINER 1 1955 and becomes inactive thereafter. RETAINER 1 1955 operates and latches with DIRECTOR 1 1956.

With stability latched in RETAINER 1 1955 and DIRECTOR 1 1956, row conductor 1957 makes +S available along column conductor 1957 and at terminal 1958.

During step 1, the first input of RETAINER 2 1959 is preconditioned by row conductor 1957 which connects to it. As multivibrator 1951 changes phase, column conductor 1953 is conditioned. Preconditioned RETAINER 2 1959 operates as the RETAINER 1 1955–DIRECTOR 1 1956 latch subsides. DIRECTOR 2 1960 latches with RETAINER 2 1959 and conditions row 2 conductor 1961 and output 2 terminal 1962.

Stability similarly transfers, upon subsequent phases of multivibrator 1951, to row 3 1963–1966, to row 4 1967–1970 and back to row 1 for another loop of the ring. Row 4 preconditions RETAINER 1 via conductor 1971—stability transfers from row 4 in the usual manner to row 1.

The flow table ring uses two ordinary transistors per stage with minimum interconnecting circuitry. Further stages 5–N may be inserted by removing conductor 1971 from row conductor 1969, reconnecting 1971 to the N row conductor, and connecting 1969 to the first input of RETAINER 5. Odd alternate RETAINER circuits 5–N are connected to column conductor 1952; even alternates to 1953.

Folded ring techniques may be incorporated by introduction of stability into an early stage row, with retention of stability in the row of folding. Output networks can then be provided to decode the outputs for above-or-below the fold values as in ordinary folded rings.

FIG. 20.—RETAINER-primed flow table logic

FIG. 20 is a flow table schematic diagram of the AB pulse generator for a technology in which the RETAINER circuit not only sets up and latches, but also conditions other RETAINER circuits to which stability may be transferred. Stated otherwise, the RETAINER circuit also includes one or more DIRECTOR circuits.

The flow table schematic designation is a circle with an inscribed triangle for the RETAINER, with its alphameric notation inside the triangle. The unstable state blocks of the flow table are noted within the related blocks; DIRECTOR-to connections follow this notation.

FIG. 21.—Superconductor flow table logic

FIG. 21 illustrates a superconductor flow table logic RETAINER 2150 and DIRECTOR 2172. Superconductors require an environmental temperature near 0° K. which normally is attained by immersing the entire sequential circuit in liquid helium. In the absence of a magnetic field, a complete circuit is without resistance—current flows indefinitely once introduced. A closed loop is provided for this superconductive current.

Current is applied along column conductor 2151 to column input terminal 2152. This current passes through one of two available paths to column out terminal 2153, through RETAINER connection 2154, terminal 2155 and back through other RETAINER circuits and conductors to current source 2156.

When current enters RETAINER circuit 2150 at column terminal 2152, it divides along lines 2157 and 2158. Where the lines cross at point 2159 the field around 2158 drives 2157 resistive—regenerative action quickly places all current in superconductive line 2158, latching RETAINER 2150 off.

Should one or more of conditioning inputs 2161–2162–2163 be superconductive when current enters at column terminal 2152, a field 2164–2165–2166 keeps line 2158 resistive. All current through RETAINER 2150 from 2152 follows line 2157 through point 2159, which is superconductive, to terminal 2167, RETAINER connection 2168, terminal 2169, along line 2170 to the DIRECTOR circuit input terminal 2171.

DIRECTOR circuit 2172 is simply the necessary connections to include in the superconductive loop an input to the RETAINER circuit 2181 to which stability is to be transferred. DIRECTOR connection 2173 jumpers terminals 2171. The ends of the two parallel row conductors 2170 and 2174 are jumpered by connectors 2175 and 2176. The loop is completed by DIRECTOR connections 2177 and 2178 to terminals 2179 and 2180 and to the conditioning inputs of RETAINER circuit 2181.

When the column input of RETAINER 2181 is energized, stability transfers to RETAINER 2181. RETAINER 2150 loses stability as its column conductor 2151 is de-energized.

Figure 22:
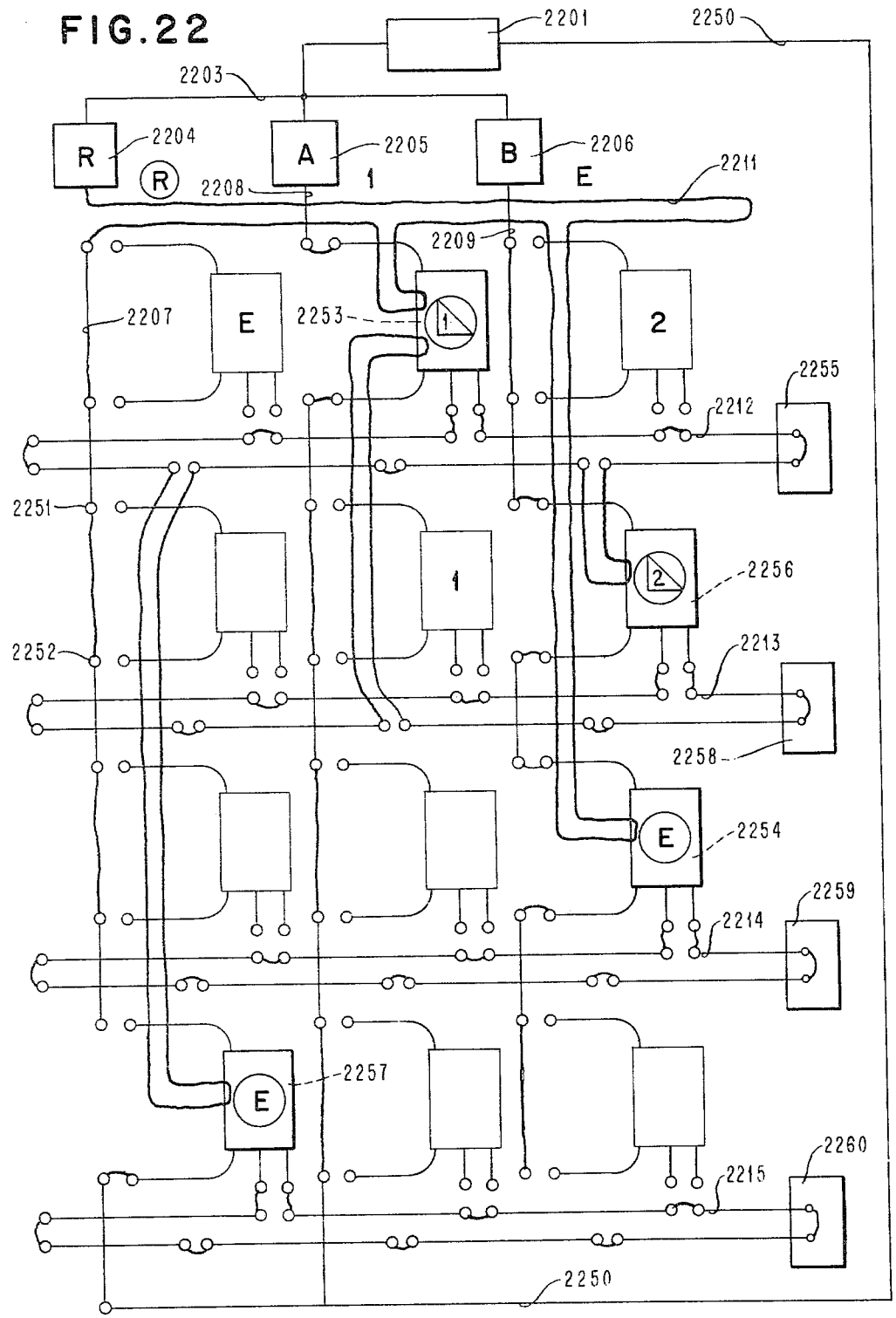
FIG. 22 is a schematic diagram of the pulse generator in superconductor technology. The diagram corresponds to a flow table worksheet.

*FIG. 22.—Superconductor AB pulse generator*

FIG. 22 shows superconductor flow table logic in the environment of the AB pulse generator. Power source 2201 provides initial current to column bus 2203 and through column switches 2204–2205–2206 to column conductors 2207–2208–2209 respectively. Return conductor 2250 completes the circuit. A work sheet is shown in light lines, with the circuit connections drawn in heavy lines.

The appropriate column conductors are broken for connection to RETAINER circuit column in and column out terminals; where unstable state designations or blanks appear, the column conductor is jumpered straight down as between terminals 2251 and 2252. RETAINER circuits are connected in series with the column conductor; all other situations involve direct jumpering of the column conductor.

Operation of the R switch 2204 resets the device simply by directly conditioning RETAINER 1 2253 and RETAINER E 2254 by means of the current through row conductor 2211 which is in series with column conductor 2207.

Conditioning current remains on the conditioning inputs to RETAINER 1 2253 and RETAINER E 2254. In the normal sequence of operation, stability shifts to RETAINER 1 2253 when A column switch 2205 is closed; stability shifts to RETAINER E 2254 if B column switch is erroneously closed following the reset.

When stability shifts to RETAINER 1, row conductor 2212 becomes part of the series circuit through column A conductor 2208 and its superconductive loop. Output device 2255, which may be an induction meter, produces the A pulse. RETAINER 2 2256 is conditioned as is RETAINER E 2257. Stability shifts to RETAINER 2 2256 when B switch 2206 is closed; row conductor 2213 is conditioned, producing the B pulse output from output device 2258 and conditioning RETAINER 1 2253.

Output devices 2259 and 2260 produce error outputs as a result of invalid sequences which set RETAINER E 2254 or 2257.

*FIG. 23.—Thyratron transistor flow table logic*

FIGS. 23a, 23b and 23c illustrate thyratron-type transistor flow table logic RETAINER and DIRECTOR circuits.

Thyratron transistor 2350 has three conditioning inputs 2351–2353, column input 2354 and output 2355. A +S signal on any conditioning input coincident to a ground potential signal on the column input completes a circuit through the transistor. The circuit is from terminal 2356, at which positive potential +V is applied, through load resistance 2357, row conductor 2358, output terminal 2355, thyratron transistor 2350 (biased on by a conditioning of in put 2351 in the FIG. 23b chart), column input 2354 to ground via the associated column conductor and column switch. Self-latching characteristics of the thyratron transistor cause it to continue conducting, after removal of the conditioning input, until the conduction circuit is broken by the column switch.

When thyratron transistor 2350 conducts, row conductor 2358 falls to potential near ground. N-type transistor 2360, previously cut off by the near +V potential at input terminal 2361, is biased for conduction by the ground potential on row conductor 2358. Terminal 2362, previously at near −V potential, rises to +S potential as transistor 2360 conducts. RETAINER circuit 2363 operates DIRECTOR circuit 2364 which conditions RETAINER circuit 2365.

Terminal 2362 is connected to conditioning inputs of RETAINER circuits in other rows—row conductor 2358 may be tapped at terminal 2359 for larger-swing control signals to operate external work circuits.

*FIG. 24.—Thyratron transistor AB pulse generator*

The AB pulse generator in FIG. 24 corresponds to flow table FIG. 1 and schematic FIG. 14. Power unit 2401 provides +V potential to main power switch 2402. Column bus 2403 connects to ground and to R button 2404, A button 2405 and B button 2406, which, when closed, connect ground potential to column conductors 2407–2408–2409 respectively. Row conductors 2411–2415 traverse the column conductors in the usual grid pattern, providing an intercept point for each block of the flow table. Error work circuit block 2450 is shown. Error block 2450 might be a manually reset latch type relay to operate an error signal.

It is assumed that R button 2404 is down when main power switch 2402 is closed to initiate operation. RETAINER R 2451 is conditioned by a near +V signal on its first conditioning input 2452 coincident with ground on its column input. The thyratron transistor in RETAINER R fires, lowering the potential on row conductor 2411 to near ground. DIRECTOR R 2453 conducts as a result of its conditioning input connection to row conductor 2411; its output rises to +S for conditioning inputs of RETAINER 1 2454 and RETAINER E 2455. Stability is transferred to RETAINER 1 by closing A-button 2405; or stability is transferred to RETAINER E 2455 by erroneous operation of B-button 2406 after a reset.

With stability in RETAINER E 2455, row conductor 2414 is held at ground potential, completing a work circuit through error signal device 2450.

Operation of the pulse generator is similar to that in previous embodiments.

*FIG. 25.—Magnetic core flow table logic*

The flow table RETAINER comprises a square-loop magnetic core 2550 (FIG. 25a) with five windings 2551–2555. Row In windings 2551 and 2552 are conditioned with half-select current by a DIRECTOR circuit in a different row at which stability is maintained just prior to being shifted to the RETAINER circuit. Windings 2551 and 2552 are alternative; they are never coincidently conditioned in a single-stability flow table logic circuit.

Column In winding 2553 is conditioned with half-select current on a related column conductor. Core 2550 switches to the 1 state of stability upon coincident current selection by a row input and column input.

FIG. 25b is a timing chart. RETAINER write pulses at selection time switch the core to 1, which state it retains after the RETAINER write pulse ends. RETAINER read, a full read current, is thereafter supplied to core 2550 via RETAINER read winding 2554, switching the core to 0. The change of state from 1 to 0 produces a signal on Row Out winding 2555.

The Row Out signal passes via feedback conductor 2556 out of RETAINER circuit 2557 to DIRECTOR circuit 2560 input terminal 2561, through a delay network 2562–2564 to DIRECTOR output terminal 2565, which connects via row conductor 2566 in windings of RETAINER circuits in other rows to prime them for transfer of stability.

*FIG. 26.—Core flow table logic AB pulse generator*

The AB pulse generator comprises write pulse generator 2601, main switch 2602, column bus 2603, column switches 2604–2606 and the matrix made up of column conductors 2607–2609 and row conductors 2610–2614. Most rows include a core flow table RETAINER and DIRECTOR—each flow table RETAINER core is subject to Read driver 2675 and a Read Drive winding such as 2554 (FIG. 25a). Read driver 2675 is operable at each change of setting of the column switches to drive all RETAINER cores to 0. A write interval follows to accomplish logical transfers.

In operation, main switch 2602 is closed and R column switch 2604 operated. A read interval occurs which resets all RETAINER cores to 0. The write drive pulse following the read interval is applied via column conductor 2607 to the Column In winding of RETAINER R 2681 and via conductor 2659 to the Row In winding of RETAINER R 2681 to switch the RETAINER R core to 1.

Stability rests in RETAINER R 2681 after the write interval. For normal operation, column A switch 2605 is operated and a read interval occurs, during which all RETAINER cores are driven to 0. Only RETAINER R 2681 core experiences a change of state—its row out winding applies a pulse to DIRECTOR R 2691 which delays the pulse for half selection of the RETAINER 1 2682 Row In winding during the immediately following write interval. Column A switch 2605 applies half select current via column conductor 2608 to the column in winding RETAINER 1 2682 to switch the core to 1.

On subsequent operation of column switch B 2606, a read interval occurs during which the core in RETAINER 2682 changes state. DIRECTOR 1 2692 delays the row out pulse of RETAINER 1 2682 until the write interval, in which RETAINER 2 2683 is switched to the 1 state of stability. Stability passes from RETAINER 1 2682 to RETAINER 2 2683 upon subsequent column switching operations. Outputs are available at terminals 2695–2698 during the write intervals following conditioning of the related RETAINER circuits.

With stability in RETAINER 2682, it is error to reset. Operation of R column switch 2604 initiates a read-write cycle, conditioning RETAINER E 2684, which signals the error even though RETAINER R 2681 resets the device normally.

With stability in RETAINER R 2681, it is error to operate B column switch 2606. During the read interval, only RETAINER R 2681 core changes state. DIRECTOR 2691 delays the change of state output to apply a row in conditioning signal to RETAINER E 2685. B column conductor 2609 applies column in conditioning to RETAINER E 2685 whereupon stability transfers to RETAINER E 2685.

PRIMED FLOW TABLE LOGIC REVIEW

The sequential switching problem is reduced to a flow table. Row and column conductors, mutually insulated, form a matrix with an intercept point for each flow table block. RETAINER circuits are applied at intercept points for stable-state designations. DIRECTOR circuits are applied for each row (optimized primed flow table logic), or the connections corresponding to DIRECTOR circuits are made (RETAINER-primed flow table logic). Shifts of stability from RETAINER to RETAINER (row to row) are controlled by column switches which condition single column conductors and by the priming from the row of previous stability.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of implementing a sequential switching circuit in flow table logic, comprising the following steps: expressing the circuit as a flow table having stable functions and switching functions in blocks arranged in columns representing various inputs and rows representing steps in the historical sequence, providing a flow table logic RETAINER circuit for each row in which a stable function is to appear, providing a flow table logic DIRECTOR circuit for each switching function, and connecting the flow table logic RETAINER circuits representing various historical steps in the logical sequence to the respectively succeeding flow table logic RETAINER circuits via respectively intervening flow table logic DIRECTOR circuits.

2. The method of implementing a sequential switching circuit comprising the following steps: expressing the circuit as a flow table having stable functions and switching functions; arraying a plurality of column conductors on a supporting structure in configuration similar to column lines in the flow table; arraying a plurality of row conductors on the structure in insulated relationship to said column conductors in configuration similar to row lines in the flow table; providing a flow table logic RETAINER circuit for each row in which a stable function is to appear, said flow table logic RETAINER circuit having the characteristic of maintaining a conditioned physical manifestation associated with the related row conductor once operated; providing a flow table logic DIRECTOR circuit for each switching function, connecting each flow table logic DIRECTOR circuit to the respective row conductor; and connecting each flow table logic RETAINER circuit to a sequentially preceding related flow table logic DIRECTOR circuit and to the respective row and column conductors.

3. A sequential switching circuit for performing sequential logic of the type which may be expressed as a flow table having a multiplicity of rows each representing a variable-related input, comprising: a multiplicity of row conductors, one for each row of the flow table, arrayed in a first plane; a plurality of row output means associated respectively with said row conductors; a plurality of column conductors, one for each column in the flow table, arrayed in a plane insulated from and substantially parallel to that of the row conductors, the direction of the column conductors being such that each column conductor most nearly approaches each row conductor at a single intercept point; variable-related means to apply conditioning stimulus to a selected column conductor; a flow table logic RETAINER circuit associated with a particular intercept point of column conductor and row conductor, said RETAINER circuit having a conditioning input and a column input and being effective responsive to coincident conditioning of said conditioning input and said column input to drive its related row conductor to a stable condition effective to condition said output means; and means associated with the row conductor thus conditionable by the related RETAINER circuit for applying a conditioning stimulus to the conditioning input of a RETAINER circuit in a different column.

4. A sequential switching circuit for performing sequential logic, which logic may be expressed as a flow table having a multiplicity of rows each representing a step in a historical sequence, and a plurality of columns each representing a variable-type input, comprising: a multiplicity of row conductors, one for each row of the flow table, arrayed in a first plane; a plurality of row output means associated respectively with said row conductors; a plurality of column conductors, one for each column in the flow table, arrayed in a plane substantially parallel to that of said row conductors, the direction of said column conductors being such that each column conductor traverses each row conductor at an intercept point; variable-related means to apply a conditioning stimulus to a selected column conductor; a flow table logic RETAINER circuit associated with a particular intercept point of column conductor and row conductor, said RETAINER circuit having a conditioning input and a column input and being effective responsive to coincident conditioning of said conditioning input and said column input to drive its related row conductor to a stable condition effective to condition said row output means; means associated with the row conductor thus conditionable by the related RETAINER circuit for applying a conditioning stimulus to the conditioning input of an additional RETAINER circuit associated at a different intercept point with a different column conductor, said additional RETAINER circuit being effective responsive to conditioning of its related column conductor to drive its related row conductor to a stable condition effective to condition its related row output means.

5. As a circuit for performing sequential logic, which logic may be expressed as a flow table having a multiplicity of rows, each representing a step in a historical sequence, and a plurality of columns each representing a variable-type input, a direct flow table logic circuit comprising: a multiplicity of row conductors, one for each row of the flow table, arrayed in a first plane; a plurality of row output means associated respectively with said row conductors; a plurality of column conductors, one for each column in the flow table, arrayed in a plane insulated from and substantially parallel to that of said row conductors, the direction of the column conductors being such that each column conductor most nearly approaches each row conductor at a single intercept point, which intercept point corresponds to a block of the flow table; variable-related means to apply conditioning stimulus to selected column conductors in sequence; a plurality of flow table logic RETAINER circuits including a first and a second RETAINER circuit connected respectively at particular intercept points in respectively different columns and rows, said RETAINER circuits each having a conditioning input and a column input and being effective responsive to coincident conditioning of said conditioning input and said column input to drive the related row conductor to a stable condition effective to condition the related output means; a flow table logic DIRECTOR circuit having a column input, a conditioning input and an output, connected across an intercept point on the row conductor thus conditionable by said first RETAINER circuit, in the same column as that of said second RETAINER circuit, for producing a conditioning stimulus at its output, and conductor means connecting said DIRECTOR circuit output to the conditioning input of said second RETAINER circuit.

6. The invention set forth in claim 5 wherein said second flow table logic RETAINER circuit comprises an electroluminescent phosphor area connected between said column input and said conditioning input, and a photoconductor optically coupled to said phosphor area and conductively coupled between ground and said conditioning input.

7. The invention set forth in claim 6 wherein said flow table logic DIRECTOR circuit comprises an electroluminescent phosphor area connected between said column input and said conditioning input and a photoconductor connected between ground and said output.

8. The invention set forth in claim 5 wherein said second flow table logic RETAINER circuit comprises a lamp connected between said column input and said conditioning input and a photoconductor optically coupled to said lamp and conductively coupled between ground and said conditioning input to form an optical latch during column input conditioning.

9. The invention set forth in claim 6, wherein said flow table logic DIRECTOR circuit comprises a lamp connected between said column input and said conditioning input and a photoconductor optically coupled to said lamp and conductively coupled between ground and said conditioning input.

10. A flow table logic circuit comprising a plurality of column conductors on a supporting structure in configuration similar to column lines in a flow table; a plurality of row conductors on said structure in insulated relationship to said column conductors in configuration similar to row lines in the flow table; a plurality of flow table logic RETAINER circuits, one for each row in which a stable function is to appear, said flow table logic RETAINER circuit having the characteristic of maintaining a conditioned physical manifestation once operated; a flow table logic DIRECTOR circuit for each switching function, means connecting each flow table logic DIRECTOR circuit to the respectively related row conductor; means connecting each RETAINER circuit to sequentially preceding related DIRECTOR circuit and to the respective row and column conductors.

11. A flow table logic implemented sequential combination lock comprising: power connection means; a plurality of pushbutton transfer contacts having respective normally closed points connected in series with said power connection means; a plurality of column conductors connected respectively to the normally open points of said pushbutton transfer contacts; a no-button column conductor connected in series with all of said normally closed points; a plurality of row conductors traversing said column conductors with mutual insulation, said rows being designatable home, first, second, third ... unlock; unlock means connected to said unlock row; means for conditioning said home row for reset stability; a flow table logic home DIRECTOR circuit in said home row, connected to said first row conductor, a first flow table logic RETAINER circuit in said first row, said first RETAINER circuit connected between a first-of-sequence-combination-related column conductor and said first row conductor to shift stability from said home row to said first row via said home DIRECTOR circuit when said pushbuttons are operated according to the combination, first-of-sequence only being operated; a first DIRECTOR circuit in said first row; an unlock RETAINER circuit in said unlock row; and means responsive to pushbutton operation according to the combination to shift stability via said first DIRECTOR circuit by means flow table logic RETAINER-DIRECTOR pairs to said unlock RETAINER circuit to operate said unlock means.

12. A sequential combination lock according to claim 9 comprising, in addition; an additional row conductor designated alarm row conductor; alarm means operable upon transfer of stability to said alarm row; a flow table logic alarm RETAINER circuit in said alarm row, a flow table logic DIRECTOR circuit in said first row, connected to said alarm row conductor and to a first-of-sequence-combination-unrelated column conductor, said alarm RETAINER circuit being connected between said first-of-sequence-combination-unrelated column conductor and said alarm row, whereby operation of a combination-unrelated button as the first-of-sequence operates said alarm.

13. In a sequential switching circuit for performing sequential logic which logic is subject to expression as a flow table having a multiplicity of rows each representing a step in a historical sequence and a plurality of columns each representing a variable-type input: a transparent insulative support plate having parallel first and second faces; first, second and third row conductors of transparent material arrayed on the first face of said support plate; first, second, third, fourth, fifth, six, seventh, eighth and ninth electroluminescent phosphor areas arrayed in a three-by-three square pattern over portions of said row conductors, three phosphor areas to each row conductor; first, second and third column conductors arrayed transversely over said row conductors at first through ninth intercept points corresponding to locations of said first through ninth phosphor areas, whereby suitable electrical potential connected to a selected column conductor and coincident grounding of a selected row conductor causes luminance of the electroluminescent phosphor at a single intercept point, other phosphor areas remaining dark; first, second, third, fourth, fifth, sixth, seventh, eighth and ninth connect points, each being related to a corresponding intercept point and comprising a transverse hole passing through said plate from first face to second face in close proximity to the related transparent column conductor; first, second, third, fourth, fifth, sixth, seventh, eighth and ninth photoconductor elements respectively related to corresponding intercept points, means to position said photoconductor elements proximate to the second face of said transparent plate for optical coupling to the related electroluminescent phosphor through said transparent plate, a conductor for connecting one side of each of said photoconductor elements to a source of ground potential; connecting means including a rivet at the first connect point for electrically connecting in series said first column conductor, first phosphor area, first row conductor, and first photoconductor under control of luminant output of said first phosphor area to accomplish the flow table RETAINER function which maintains said first row conductor stable in a conditioned state near ground potential; means for accomplishing the flow table DIRECTOR function upon subsequent conditioning of said second column conductor prior to complete deconditioning of said first row conductor, which produces temporary luminant output of the second phosphor area and a resultant temporary conductivity of the related second photoconductor, said means for accomplishing the DIRECTOR function including a rivet at a connect point for connecting in series said second column conductor, row conductor and said second photoconductor, whereupon said third phosphor area produces luminant output sufficient to condition the related third photoconductor and thereby maintain said second row conductor stable in a conditioned state.

14. The invention set forth in claim 13, comprising in addition connecting means including a rivet at a fourth connect point to accomplish the RETAINER function at a fourth intercept point where said third row conductor and said first column conductor cross, connecting means including a rivet at a fifth connect point to accomplish the RETAINER function at a fifth intercept point where said third row conductor and said third column conductor cross, connecting means including the rivet at said fourth connect point for accomplishing the DIRECTOR function from a sixth intercept point where said second row conductor and said first column conductor cross, and connecting means including the rivet at said fifth connect point for accomplishing the DIRECTOR function from a seventh intercept point where said second row conductor and said third column conductor cross, whereby stability is transferable from the first intercept point to the second intercept point by connection of electrical potential to said second column, and stability is subsequently transferable to said fourth intercept point by connection of electrical potential to said first column or alternatively to said fifth intercept point by connection of electrical potential to said third column conductor.

15. As a sequential switching circuit for performing sequential logic, which logic may be expressed as a flow table having a multiplicity of rows each representing a step in a historical sequence, and a plurality of columns each representing a variable-type input, a preconditioned flow table logic circuit comprising: a multiplicity of row conductors, one for each row of the flow table, arrayed in a first plane; a plurality of column conductors, one for each column in the flow table, arrayed in a plane insulated from and substantially parallel to that of said row conductors, the direction of said column conductors being such that each column conductor traverses each row conductor at an intercept point; variable-related means to condition a selected column conductor; row output means; first and second flow table logic RETAINER circuits, associated with a particular intercept point, said RETAINER circuits each having an output, a preconditioning input and a column input and being effective responsive to coincident conditioning of said preconditioning input and said column input to condition its output; and means responsive to conditioning of the output of said first RETAINER circuit to precondition the said second RETAINER circuit.

16. The invention set forth in claim 15, wherein said flow table logic RETAINER circuit comprises a first field effect device with row and column inputs and an oppositely-oriented second field effect device in regenerative feedback relationship with said first field-effect device, whereby coincident conditioning of row and column inputs causes conduction in said first field effect device, which causes conduction in said second field effect device and maintains both devices conductive regardless of row input so long as column input remains conditioned.

17. The invention set forth in claim 16 wherein said flow table logic DIRECTOR circuit comprises a third field effect device oriented similarly to said second field effect device, biased for conduction by conditioning of the related row conductor.

18. The invention according to claim 15, wherein said flow table logic RETAINER circuit comprises a superconductive latch having a plurality of conditioning inputs, said row conductor comprises a closed loop, and said DIRECTOR circuit comprises conductive means connecting a conditioning input of a sequentially subsequent RETAINER circuit into said closed loop.

19. As a sequential switching circuit for performing sequential logic, which logic may be expressed as a flow table having a multiplicity of rows representing respective steps in a historical sequence, and having a plurality of columns each representing a variable-type input, an optimized preconditioned flow table logic circuit comprising: (a) a multiplicity of row conductors, one for each row of the flow table, arrayed in a first plane; (b) a plurality of row output means associated respectively with said row conductors; (c) a plurality of column conductors, one for each column in the flow table, arrayed in a plane insulated from and substantially parallel to that of the row conductors, the direction of the column conductors being such that each column conductor most nearly approaches each row conductor at a single intercept point; (d) variable-related means to apply conditioning signals to selected column conductors in sequence; (e) a plurality of flow table logic RETAINER circuits including a first and a second RETAINER circuit associated with particular intercept points of column conductors and row conductors, said RETAINER circuits each having a conditioning input and a column input and being effective responsive to coincident conditioning of said conditioning input and said column input; and (f) a flow table logic DIRECTOR circuit connected to said first flow table logic RETAINER circuit in the same row as said first flow table logic DIRECTOR circuit, for conditioning the row conductor, said output means, and said second RETAINER circuit conditioning input.

20. The invention set forth in claim 19, wherein each of said RETAINER circuits comprises a two-out-of-many-input inverter having an output and inputs including a column input, a latching row input and one or more preconditioning inputs, and said DIRECTOR circuit comprises a two-out-of-many-input inverter having an output, a permanently conditioned input and one or more latching inputs, comprising: conductor means connecting the output of said RETAINER circuit to the latching input of said DIRECTOR circuit, and conductor means connecting said DIRECTOR circuit to the related row conductor.

21. The invention set forth in claim 19, wherein said flow table logic RETAINER circuit comprises a thyratron type transistor with its emitter connected to said column input, with its base connected to said conditioning inputs, and with its collector connected to said output, and said flow table logic DIRECTOR circuit comprises an inverter with its control element connected to said RETAINER circuit output and its output connected to the conditioning input of said second RETAINER circuit.

22. The invention according to claim 19 wherein said flow table logic RETAINER circuit comprises a magnetic core having a column input winding and a conditioning input winding, each input winding being a half-select winding, a full read winding and a row output winding, said output winding being connected to a flow table logic DIRECTOR circuit comprising delay means connected to said flow conductor.

23. A flow table logic implemented $n$-stage ring comprising: first and second column conductors; first, second, third . . . and $n$th row conductors, insulatably traversing said column conductors to form $2n$ intercept points corresponding to first and second columns of $n$ blocks each in the flow table; vibrator means for producing phase-time-varying complementary electrical vibrations on said column conductors, which are thus respectively conditioned and deconditioned on alternate vibrations; flow table logic RETAINER circuits each having a conditioning input and column input connected at alternate odd intercept points of said first column conductor; $n$ flow table logic RETAINER circuits connected at alternate even intercept points of said second column conductor; $n$ flow table logic DIRECTOR circuits, associated respectively with said first-$n$th row conductors, means connecting RETAINER circuits 1, 2 . . . ($n$–1) to conditioning inputs of succeeding RETAINER circuits 2, 3 . . . $n$ via respectively intervening DIRECTOR circuits for transfer of stability upon respectively succeeding vibrations to transfer stability from a certain RETAINER circuit in a certain block to the respectively succeeding RETAINER circuit in a block in a different row, and means for conditioning the conditioning input of said RETAINER circuit 1 for transferring stability to said RETAINER circuit 1.

References Cited by the Examiner

UNITED STATES PATENTS

| | | | |
|---|---|---|---|
| 2,346,616 | 4/1944 | Saxby | 235—156 |
| 2,600,155 | 6/1952 | Cataldo et al. | 200—87 |

NEIL C. READ, *Primary Examiner.*